(12) United States Patent
Tirucherai Muralidharan et al.

(10) Patent No.: US 10,560,294 B2
(45) Date of Patent: Feb. 11, 2020

(54) METHODS AND APPARATUS FOR TRANSMISSION AND RECEPTION WITH PARTIAL ALLOCATION IN ORTHOGONAL FREQUENCY DIVISION MULTIPLE ACCESS/SINGLE-CARRIER FREQUENCY DIVISION MULTIPLE ACCESS SYSTEMS

(71) Applicant: QUALCOMM Incorporated, San Diego, CA (US)

(72) Inventors: Vijayvaradharaj Tirucherai Muralidharan, Bangalore (IN); Shashidhar Vummintala, Bangalore (IN); Gowrisankar Somichetty, Bangalore (IN); Arvind Sridharan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/899,058

(22) Filed: Feb. 19, 2018

(65) Prior Publication Data
US 2018/0241593 A1 Aug. 23, 2018

(30) Foreign Application Priority Data
Feb. 21, 2017 (IN) .............................. 201741006133

(51) Int. Cl.
*H04L 27/00* (2006.01)
*H04L 27/20* (2006.01)
(Continued)

(52) U.S. Cl.
CPC ...... *H04L 27/0008* (2013.01); *H04L 27/2035* (2013.01); *H04J 11/0066* (2013.01); *H04J 2011/0009* (2013.01); *H04L 5/0048* (2013.01)

(58) Field of Classification Search
None
See application file for complete search history.

(56) References Cited

U.S. PATENT DOCUMENTS 8,948,154 B2 * 2/2015 Gaal .................... H04L 5/0037
370/343
2002/0183799 A1 * 12/2002 Silvian ................ A61N 1/3727
607/32
(Continued)

FOREIGN PATENT DOCUMENTS

EP 2950494 A1 12/2015

OTHER PUBLICATIONS

International Search Report and Written Opinion—PCT/US2018/018738—ISA/EPO—dated Apr. 20, 2018.

*Primary Examiner* — Eunsook Choi
(74) *Attorney, Agent, or Firm* — Patterson & Sheridan, L.L.P.

(57) ABSTRACT

Techniques and apparatus for transmission and reception with partial allocation in orthogonal frequency division multiple access (OFDMA)/single-carrier frequency division multiple access (SC-FDMA) systems are provided. One technique includes determining first parameter(s) to apply to transmission/receive processing of a signal, based in part on a resource allocation for the signal. The resource allocation is partitioned out of a larger system bandwidth. Second parameter(s) to apply to the transmission/receive processing are determined based at least in part on the first parameter(s). Transmission/receive processing of the signal is performed in accordance with the first and second parameters.

26 Claims, 19 Drawing Sheets

(51) Int. Cl.
*H04L 5/00* (2006.01)
*H04J 11/00* (2006.01)

(56) References Cited

U.S. PATENT DOCUMENTS

| | | | |
|---|---|---|---|
| 2013/0083749 A1* | 4/2013 | Xu | H04W 74/0833 370/329 |
| 2014/0270002 A1* | 9/2014 | Schubert | H04L 1/0045 375/320 |
| 2014/0378079 A1* | 12/2014 | Adnani | H04B 1/16 455/266 |
| 2015/0365926 A1* | 12/2015 | Long | H04W 4/70 370/329 |
| 2016/0128072 A1* | 5/2016 | Rajagopal | H04L 27/2602 370/329 |
| 2016/0359614 A1* | 12/2016 | Hao | H04L 7/033 |
| 2017/0026844 A1* | 1/2017 | Baldemair | H04B 7/0465 |
| 2017/0033887 A1 | 2/2017 | Lei et al. | |
| 2018/0234921 A1* | 8/2018 | Huang | H04W 52/0235 |
| 2019/0089448 A1* | 3/2019 | Jakobsson | H04B 1/0064 |

\* cited by examiner

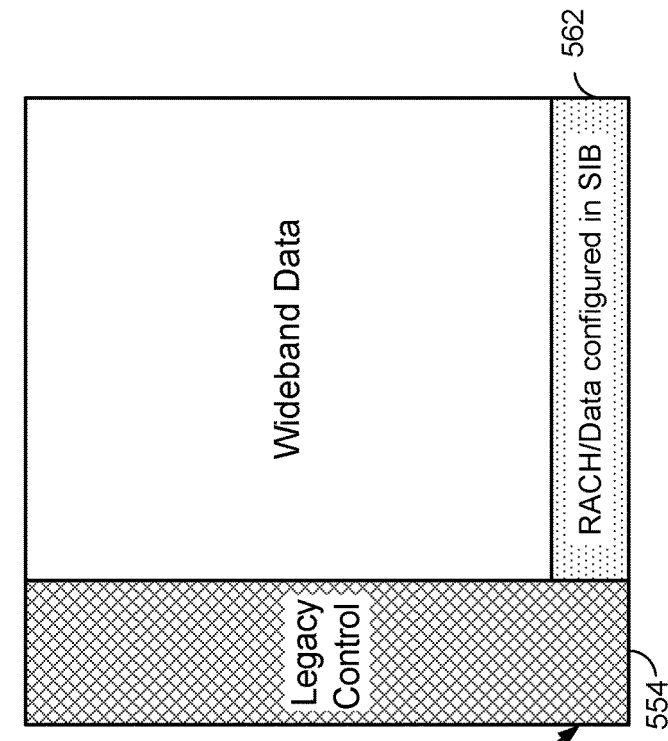
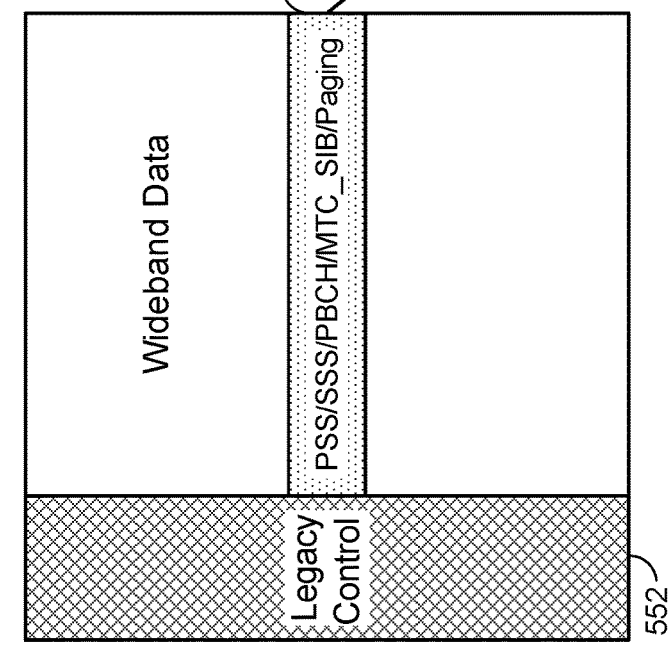
FIG. 5A
FIG. 5B

METHODS AND APPARATUS FOR TRANSMISSION AND RECEPTION WITH PARTIAL ALLOCATION IN ORTHOGONAL FREQUENCY DIVISION MULTIPLE ACCESS/SINGLE-CARRIER FREQUENCY DIVISION MULTIPLE ACCESS SYSTEMS

CROSS-REFERENCE TO RELATED APPLICATIONS

This application claims the benefit of Indian Provisional Patent Application Serial No. 201741006133, filed Feb. 21, 2017, which is assigned to the assignee hereof and hereby expressly incorporated by reference herein.

BACKGROUND

I. Field of the Disclosure

Certain aspects of the present disclosure generally relate to wireless communications, and more particularly, to transmitter/receiver architecture designs of orthogonal frequency division multiple access (OFDMA)/single-carrier frequency division multiple access (SC-FDMA) systems in which the resources allocated for a transmission are a subset of the full system bandwidth, e.g., such as in enhanced machine type communication (eMTC).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication that involve one or more entities that do not necessarily need human interaction. MTC UEs may include UEs that are capable of MTC communications with MTC servers and/or other MTC devices through Public Land Mobile Networks (PLMN), for example. In general, MTC devices may include a broad class of devices in wireless communications including, but not limited to: Internet of Things (IoT) devices, Internet of Everything (IoE) devices, wearable devices and low cost devices. To enhance coverage of certain devices, such as MTC devices, "bundling" may be utilized in which certain transmissions are sent as a bundle of transmissions, for example, with the same information transmitted over multiple subframes.

Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method for wireless communications that may be performed, for example, by an apparatus (e.g., a base station (BS), user equipment (UE), etc.). The method generally includes determining a first one or more parameters to apply to transmission processing of a signal, based at least in part on a resource allocation for the signal. The resource allocation is partitioned out of a larger system bandwidth. The method also includes determining a second one or more parameters to apply to the transmission processing of the signal based at least in part on the determined first one or more parameters. The method further includes performing the transmission processing of the signal in accordance with the first and second parameters, and transmitting the signal after performing the transmission processing.

Certain aspects of the present disclosure provide an apparatus for wireless communications. The apparatus includes at least one processor and a memory coupled to the at least one processor. The at least one processor is configured to determine a first one or more parameters to apply to transmission processing of a signal, based at least in part on a resource allocation for the signal. The resource allocation is partitioned out of a larger system bandwidth. The at least one processor is also configured to determine a second one or more parameters to apply to the transmission processing of the signal based at least in part on the determined first one or more parameters. The at least one processor is further configured to perform the transmission processing of the signal in accordance with the first and second parameters, and transmit the signal after performing the transmission processing.

Certain aspects of the present disclosure provide an apparatus for wireless communications. The apparatus generally includes means for determining a first one or more parameters to apply to transmission processing of a signal, based at least in part on a resource allocation for the signal. The resource allocation is partitioned out of a larger system bandwidth. The apparatus also includes means for determining a second one or more parameters to apply to the transmission processing of the signal based at least in part on the determined first one or more parameters. The apparatus further includes means for performing the transmission processing of the signal in accordance with the first and second parameters, and means for transmitting the signal after performing the transmission processing.

Certain aspects of the present disclosure provide a computer-readable medium having computer executable code stored thereon for wireless communication by an apparatus. The computer executable code generally includes code for determining a first one or more parameters to apply to transmission processing of a signal, based at least in part on a resource allocation for the signal. The resource allocation is partitioned out of a larger system bandwidth. The computer executable code also includes code for determining a second one or more parameters to apply to the transmission processing of the signal based at least in part on the determined first one or more parameters. The computer executable code further includes code for performing the transmission processing of the signal in accordance with the first and second parameters, and code for transmitting the signal after performing the transmission processing.

Certain aspects of the present disclosure provide a method for wireless communications that may be performed, for example, by an apparatus (e.g., a base station (BS), user equipment (UE), etc.). The method generally includes determining a first one or more parameters to apply to receive processing of a signal received from another apparatus, based at least in part on a resource allocation used for the signal. The resource allocation is partitioned out of a larger system bandwidth. The method also includes determining a second one or more parameters to apply to the receive processing of the signal based at least in part on the determined first one or more parameters. The method further includes performing the receive processing of the signal in accordance with the first and second parameters.

Certain aspects of the present disclosure provide an apparatus for wireless communications. The apparatus includes at least one processor and a memory coupled to the at least one processor. The at least one processor is configured to determine a first one or more parameters to apply to receive processing of a signal received from another apparatus, based at least in part on a resource allocation used for the signal. The resource allocation is partitioned out of a larger system bandwidth. The at least one processor is also configured to determine a second one or more parameters to apply to the receive processing of the signal based at least in part on the determined first one or more parameters. The at least one processor is further configured to perform the receive processing of the signal in accordance with the first and second parameters.

Certain aspects of the present disclosure provide an apparatus for wireless communications. The apparatus generally includes means for determining a first one or more parameters to apply to receive processing of a signal received from another apparatus, based at least in part on a resource allocation used for the signal. The resource allocation is partitioned out of a larger system bandwidth. The apparatus also includes means for determining a second one or more parameters to apply to the receive processing of the signal based at least in part on the determined first one or more parameters. The apparatus further includes means for performing the receive processing of the signal in accordance with the first and second parameters.

Certain aspects of the present disclosure provide a computer-readable medium having computer executable code stored thereon for wireless communication by an apparatus. The computer executable code generally includes code for determining a first one or more parameters to apply to receive processing of a signal received from another apparatus, based at least in part on a resource allocation used for the signal. The resource allocation is partitioned out of a larger system bandwidth. The computer executable code also includes code for determining a second one or more parameters to apply to the receive processing of the signal based at least in part on the determined first one or more parameters. The computer executable code further includes code for performing the receive processing of the signal in accordance with the first and second parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

FIGS. 5A and 5B illustrate an example of MTC co-existence within a wideband system, such as LTE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
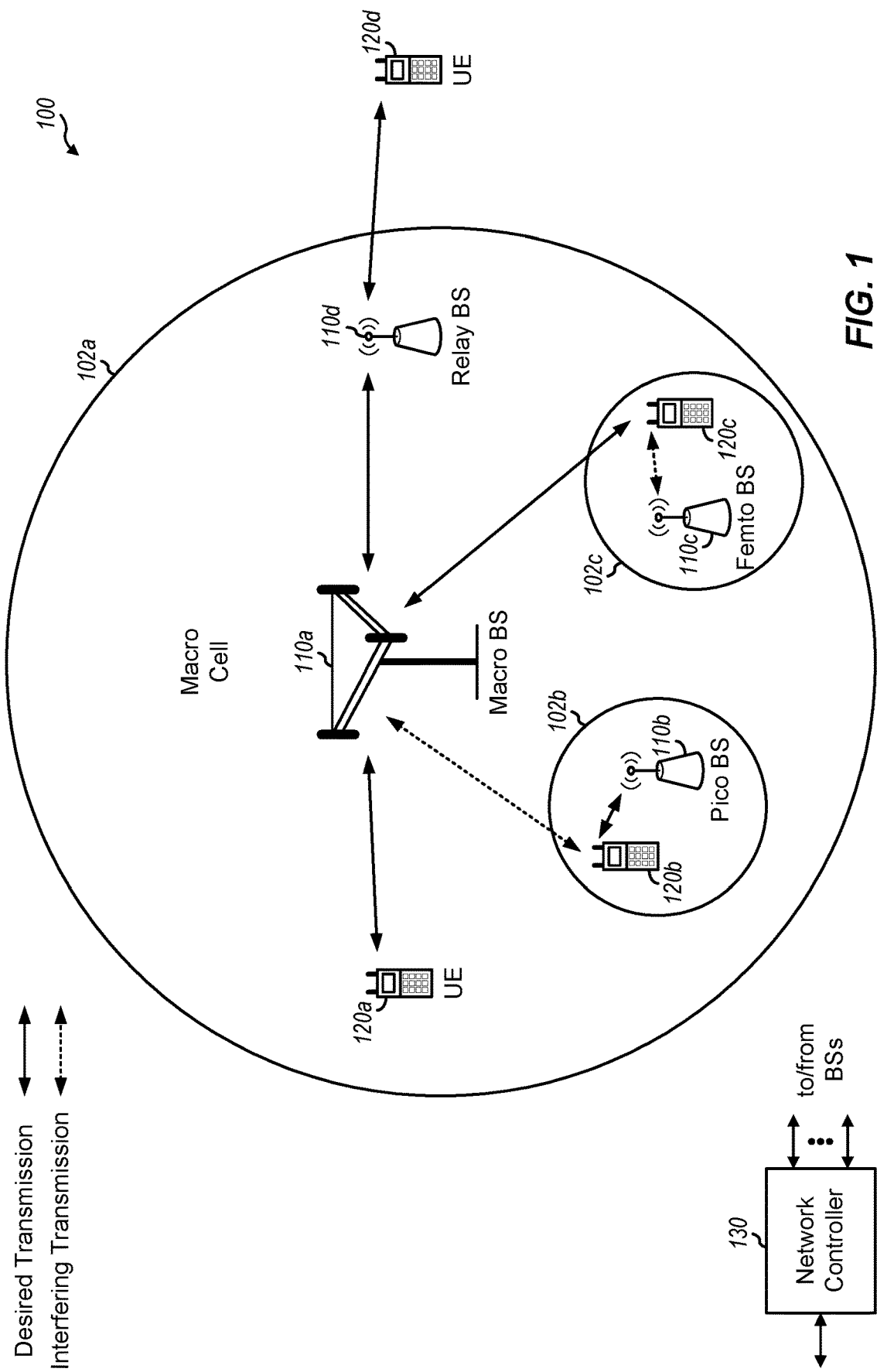
FIG. 1 is a block diagram conceptually illustrating an example of a wireless communication network, in accordance with certain aspects of the present disclosure.

Aspects of the present disclosure provide techniques and apparatus for transmission/reception in orthogonal frequency division multiple access (OFDMA)/single-carrier frequency division multiple access (SC-FDMA) systems with partial resource allocations (e.g., the resources allocated for transmission/reception are a subset of a full system bandwidth).

As described in more detail below, a transmitting/receiving apparatus (e.g., BS, UE, etc.) may determine first parameters (e.g., a local oscillator (LO) frequency, front end processing bandwidth, inverse fast fourier transform (IFFT) size, FFT size etc.) to apply to transmission/receive processing of a signal based in part on an amount of resources allocated for the signal. The resources allocated for the signal, for example, may be partitioned out of a larger system bandwidth. The apparatus may also determine second parameters (e.g., tone offset, phase ramp, phase offset, LO frequency offset, etc.) to apply to the transmission/receive processing of the signal based in part on the first parameters. The second parameters may relate to a residual phase compensation procedure associated with the transmission/receive processing. The apparatus may then perform the transmission/receive processing in accordance with the first and second parameters.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem.

Accordingly, one or more aspects taught herein may be incorporated into a UE. Some UEs may be considered machine-type communication (MTC) UEs or evolved MTC (eMTC) devices. MTC and eMTC UEs include, for example, robots, drones, remote devices, sensors, meters, monitors, location tags, etc., that may communicate with a BS, another device (e.g., remote device), or some other entity. MTC devices and/or eMTC devices, as well as other types of devices, may include Internet of Everything (IoE) or Internet of Things (IoT) devices, such as NB-IoT (narrowband Internet-of-Things) devices, and techniques disclosed herein may be applied to MTC devices, eMTC devices, NB-IoT devices, as well as other devices.

It is noted that while aspects may be described herein using terminology commonly associated with 3G and/or 4G wireless technologies, aspects of the present disclosure can be applied in other generation-based communication systems, such as 5G and later, including NR technologies.

An Example Wireless Communication System

FIG. 1 is a diagram illustrating a wireless network 100 in which aspects of the present disclosure may be practiced. For example, the BS 110 and/or UE 120 may determine first parameters to apply to transmission processing (e.g., if transmitting a signal) or receive processing (e.g., if a signal has been received) of a signal, based in part on a resource allocation of the signal. The BS 110 and/or UE 120 may also determine second parameters to apply to transmission or receive processing based in part on the first parameters. The BS 110 and/or UE 120 may then perform the respective transmission/receive processing in accordance with the determined first and second parameters. In some aspects, the first and second parameters may be adaptively changed based on where the resource allocation is in the system bandwidth.

The wireless network 100 may be an LTE network or some other wireless network, such as a NR or 5G network, and/or may support NB-IoT, MTC, eMTC, etc. Wireless network 100 may include a number of BSs 110 and other network entities. A BS is an entity that communicates with user equipments (UEs) and may also be referred to as a base station, eNB, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, an BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical/healthcare device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a navigation/positioning device (e.g., satellite positioning system (SPS) such as GPS (global positioning system), Beidou, GLONASS, Galileo, or terrestrial based, etc.), or any other suitable device that is configured to communicate via a wireless or wired medium. Some UEs may be considered evolved or enhanced machine-type communication (eMTC)

UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation (e.g., HD-FDD), etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment, for example, of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 20 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
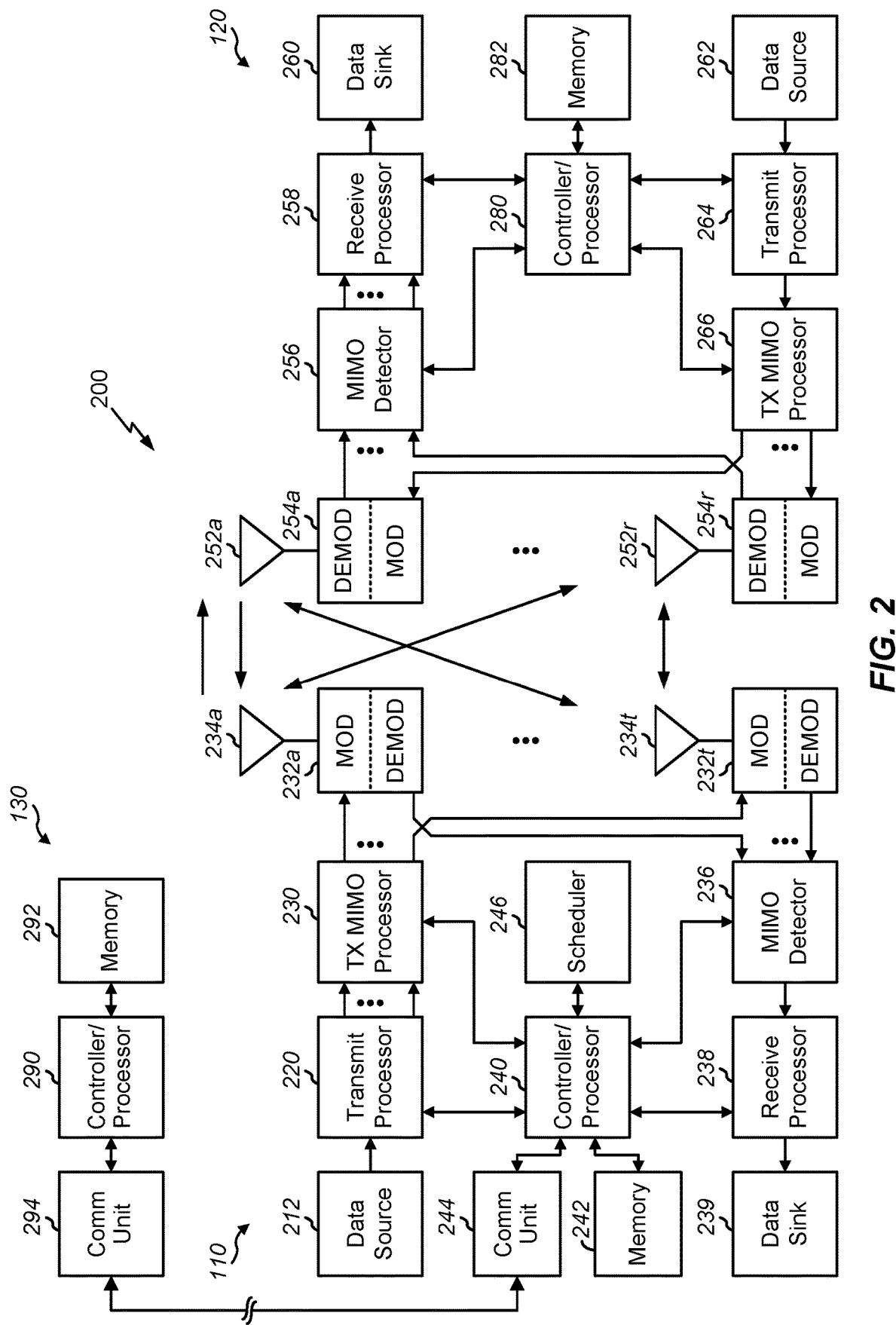
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T≥1 and R≥1. One or more components of the BS 110 and UE 120 may be used to practice aspects of the present disclosure.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform techniques presented herein for transmitting and receiving with partial allocation in OFDMA/SC-FDMA systems (e.g., such as in eMTC). For example, controller/processor 280 and/or other controllers/processors and modules at UE 120 may perform or direct operations by the UE in FIGS. 12-13, and/or other processes for the techniques described herein. The controller/processor 240 and/or other controllers/processors and modules at BS 110 may perform operations by the BS in FIGS. 12-13 and/or other processes for the techniques described herein. Memories 242 and 282 may store data and program codes for base station 110 and UE 120, respectively. A scheduler 246 may schedule UEs for data transmission on the downlink and/or uplink.

Figure 3:
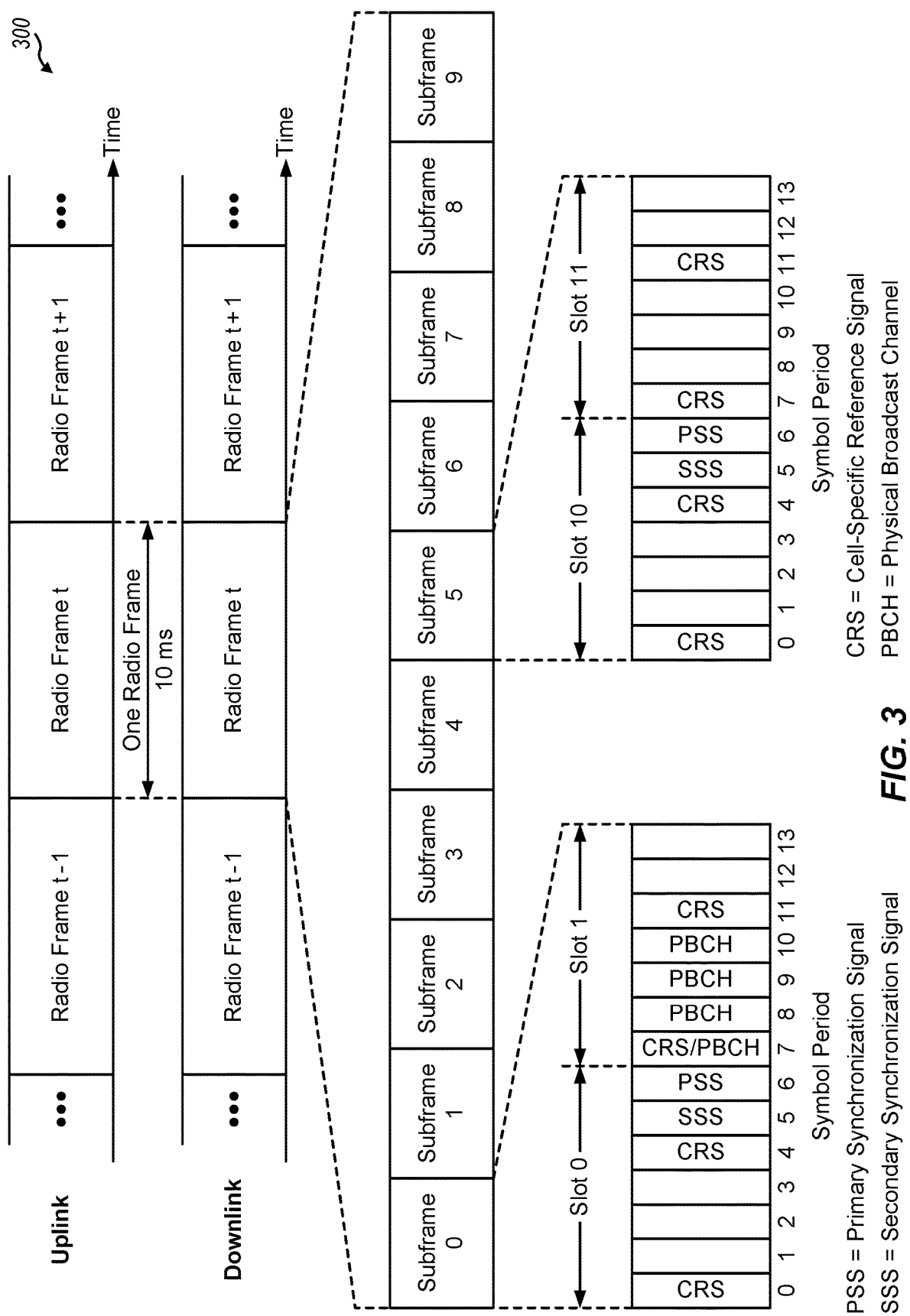
FIG. 3 is a block diagram conceptually illustrating an example of a frame structure in a wireless communications network, in accordance with certain aspects of the present disclosure.

FIG. 3 shows an exemplary frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

Figure 4:
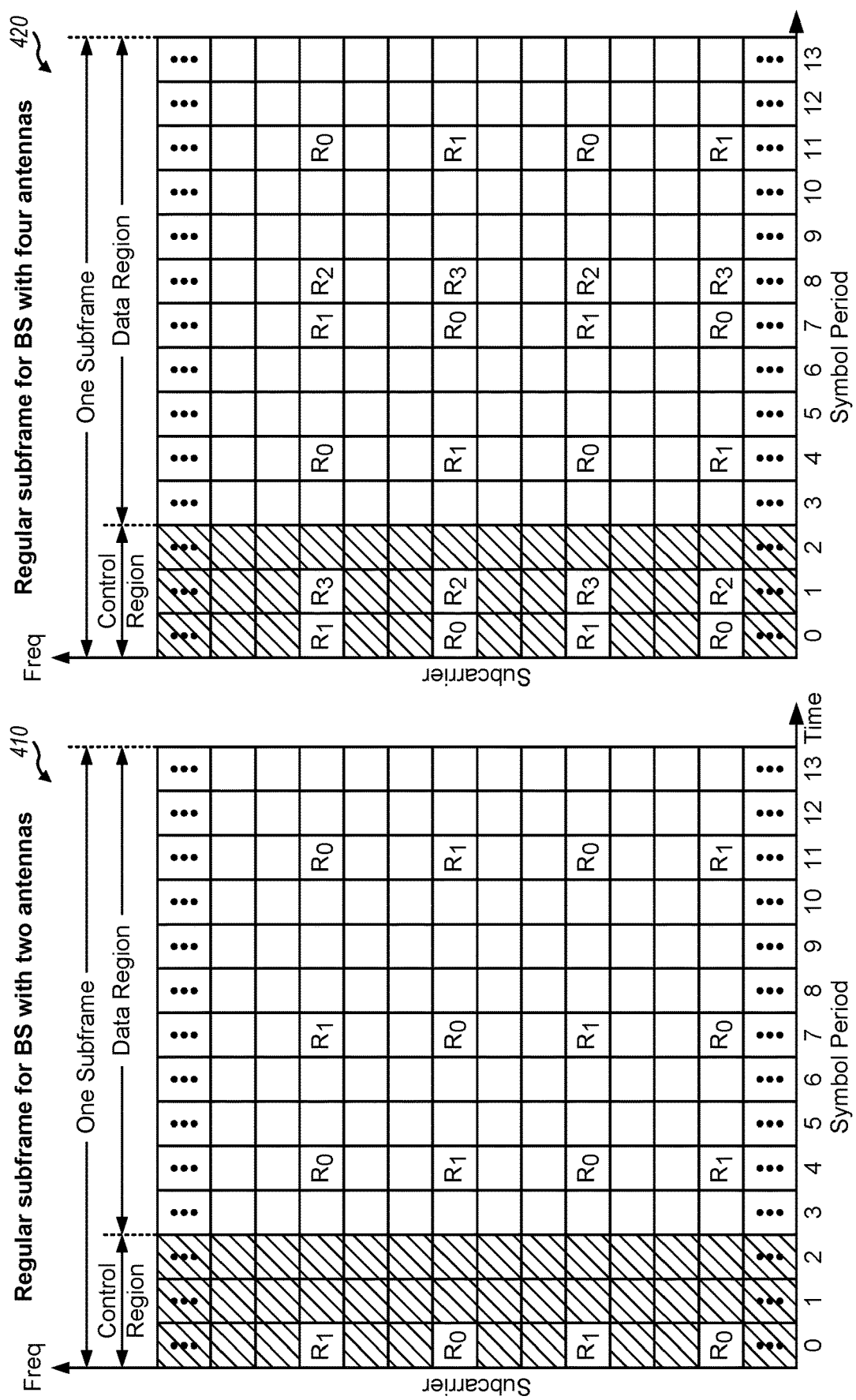
FIG. 4 is a block diagram conceptually illustrating exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (e.g., relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

FIGS. 5A and 5B illustrate examples of how UEs in MTC and/or eMTC operation may co-exist within a wideband system (e.g., 1.4/3/5/10/15/20 MHz), such as LTE. As illustrated in the example frame structure of FIG. 5A, subframes 510 associated with MTC and/or eMTC operation may be time division multiplexed (TDM) with regular subframes 520 associated with LTE (or some other RAT).

As mentioned above, MTC and/or eMTC operation may be supported in the wireless communication network (e.g., in coexistence with LTE or some other RAT). That is, eMTC may co-exist with other LTE services within the same bandwidth, support FDD, TDD and half duplex (HD) modes, re-use existing LTE base stations with software update (e.g., according to E-UTRAN vendors), etc. FIGS. 5A and 5B, for example, illustrate an example of how UEs in MTC and/or eMTC operation may co-exist within a wideband system (e.g., 1.4/3/5/10/15/20 MHz), such as LTE.

As illustrated in the example frame structure of FIG. 5A, subframes 510 associated with MTC and/or eMTC operation may be time division multiplexed (TDM) with regular subframes 520 associated with LTE (or some other RAT). Additionally or alternatively, as illustrated in the example frame structure of FIG. 5B, one or more narrowband regions 560, 562 used by narrowband UEs may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, such as LTE Release 13, each eMTC UE (e.g., Cat M1 UEs) may operate (e.g., monitor/receive/transmit) within one narrowband region (e.g., at 1.4 MHz or 6 RBs) at a time. In other cases, such as LTE Release 14, eMTC UEs may operate on a 5 MHz narrowband region (e.g., using 25 RBs).

At any given time, eMTC UEs may re-tune to other narrowband regions in the wider system bandwidth. That is, an eMTC UE may switch or hop between multiple narrowband regions in order to reduce interference. In some examples, multiple eMTC UEs may be served by the same narrowband region. In yet other examples, different combinations of eMTC UEs may be served by one or more same narrowband regions and/or one or more different narrowband regions.

As shown, the eMTC UEs may operate (e.g., monitor/receive/transmit) within the narrowband regions for various different operations. For example, as shown in FIG. 5B, a first narrowband region 560 of a subframe 552 may be monitored by one or more eMTC UEs for either a PSS, SSS, PBCH, MTC signaling, or paging transmission from a BS in the wireless communication network. As also shown in FIG. 5B, a second narrowband region 562 of a subframe 554 may be used by eMTC UEs to transmit a RACH or data previously configured in signaling received from a BS. In some cases, the second narrowband region may be utilized by the same UEs that utilized the first narrowband region (e.g., the UEs may have re-tuned to the second narrowband region to transmit after monitoring in the first narrowband region). In some cases (although not shown), the second narrowband region may be utilized by different UEs than the UEs that utilized the first narrowband region.

Certain systems may provide eMTC UEs with coverage enhancements of up to 20 dB to support low cost MTC devices (e.g., such as bandwidth reduced low complexity (BL) or coverage enhancement (CE) users) with a single antenna and a basic receiver, and/or located in cell edges to connect. That is, eMTC UEs and base stations may perform measurements at low SNRs (e.g., −15 dB to −20 dB). In order to achieve coverage enhancement, multiple repetitions/instances (e.g., bundling) of the same message (with different redundancy versions) may be transmitted over one or more physical channels.

Although the examples described herein assume a narrowband of 6 RBs, those skilled in the art will recognize that the techniques presented herein may also be applied to different sizes of narrowband regions (e.g., 25 RBs).

In the case of NB-IoT, the wireless communication network (e.g., LTE Release 13, or greater) may support deployments using one physical resource block (PRB) (e.g., 180 kHz+20 kHz guard band). NB-IoT deployments may utilize higher layer components of LTE and hardware to allow for reduced fragmentation and cross compatibility with, for example, NB-LTE and eMTC. In one case, NB-IoT may be deployed in-band and coexist with legacy GSM/WCDMA/LTE system(s) deployed in the same frequency band. Wideband LTE channel, for example, may be deployed in various bandwidths between 1.4 MHz to 20 MHz, and there may be a dedicated PRB for use by NB-IoT, or the RBs allocated for NB-IoT may be dynamically allocated (e.g., by a base station). In an in-band deployment, one PRB, or 180 kHz, of a wideband LTE channel may be used for NB-IoT. In some deployments, NB-IoT may be deployed standalone. In a standalone deployment, one 180 kHz carrier may be used to carry NB-IoT traffic and GSM spectrum may be reused. In some deployments, NB-IoT may be deployed in the unused resource blocks within a LTE carrier guard-band.

NB-IoT may support single-tone and multi-tone assignments. For example, in uplink, 15 kHz or 3.75 kHz tone spacing may be used with single tone allocation or multiple tone allocation. For 15 kHz tone or subcarrier spacing, up to 12 tones or subcarriers can be used in a resource unit with single tone allocation and for 3.75 kHz tone spacing up to 48 tones can be used in a resource unit with single tone allocation.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 8 and 9.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
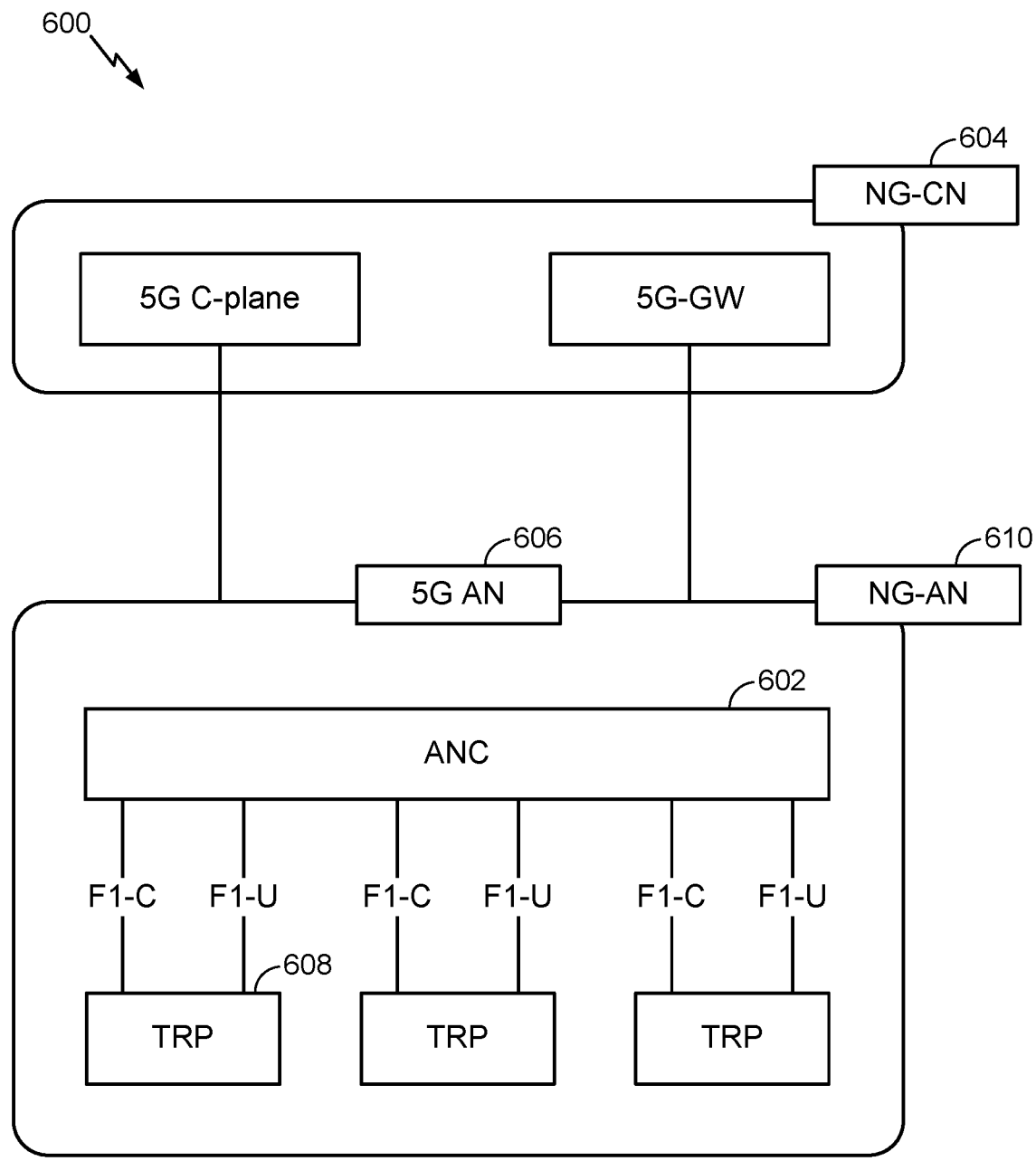
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at the ANC. The backhaul interface to neighboring next generation access nodes (NG-ANs) may terminate at the ANC. The ANC may include one or more TRPs 608 (which may also be referred to as BSs, NR BSs, Node Bs, 5G NBs, APs, gNB, or some other term). As described above, a TRP may be used interchangeably with "cell."

The TRPs 608 may be a distributed unit (DU). The TRPs may be connected to one ANC (ANC 602) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 600 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 610 may support dual connectivity with NR. The NG-AN may share a common fronthaul for LTE and NR.

The architecture may enable cooperation between and among TRPs 608. For example, cooperation may be preset within a TRP and/or across TRPs via the ANC 602. According to aspects, no inter-TRP interface may be needed/present.

According to aspects, a dynamic configuration of split logical functions may be present within the architecture 600. The PDCP, RLC, MAC protocol may be adaptably placed at the ANC or TRP.

According to certain aspects, a BS may include a central unit (CU) (e.g., ANC 602) and/or one or more distributed units (e.g., one or more TRPs 608).

Figure 7:
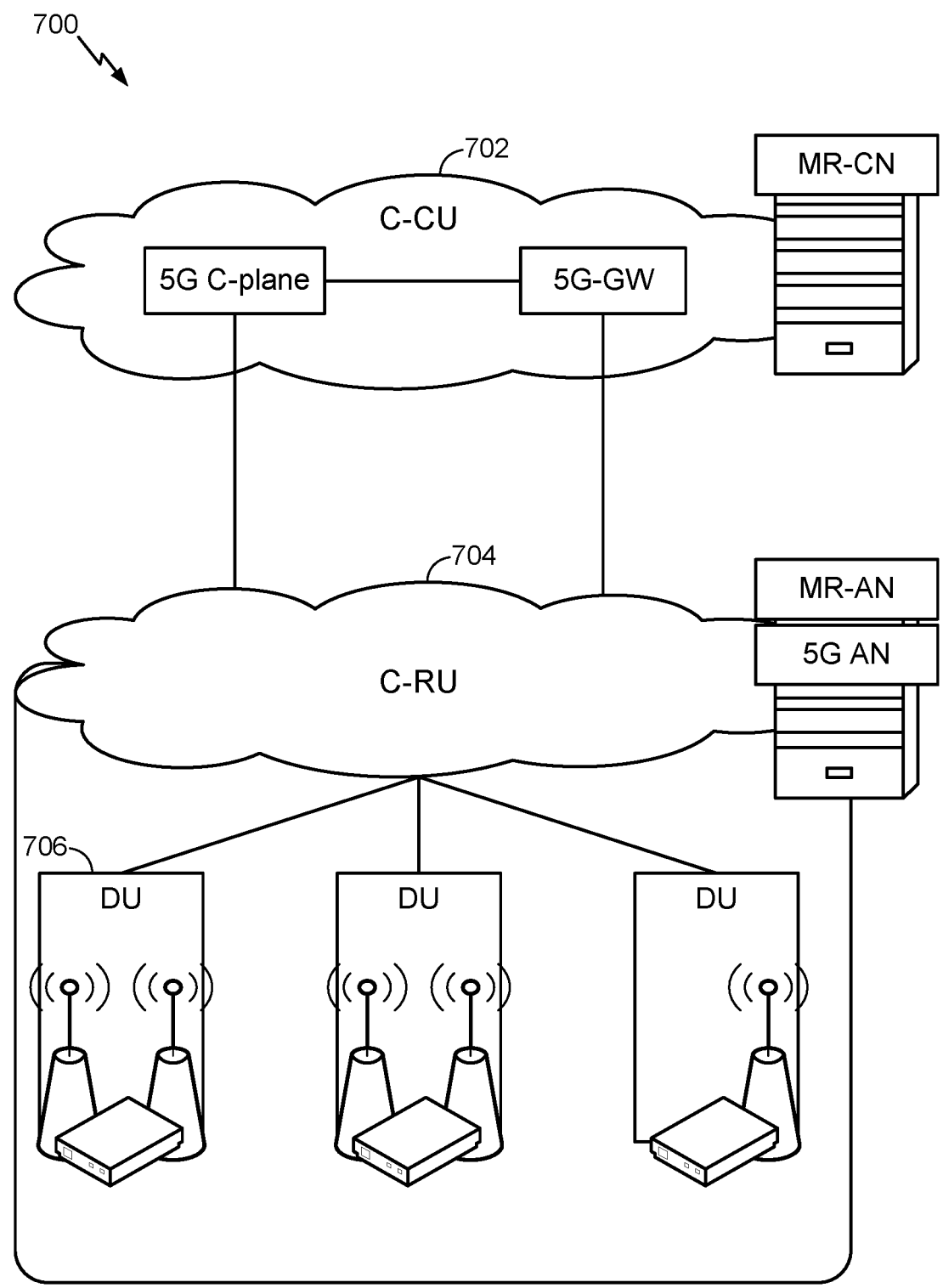
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. The C-CU may be centrally deployed. C-CU functionality may be offloaded (e.g., to advanced wireless services (AWS)), in an effort to handle peak capacity.

A centralized RAN unit (C-RU) 704 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 8:
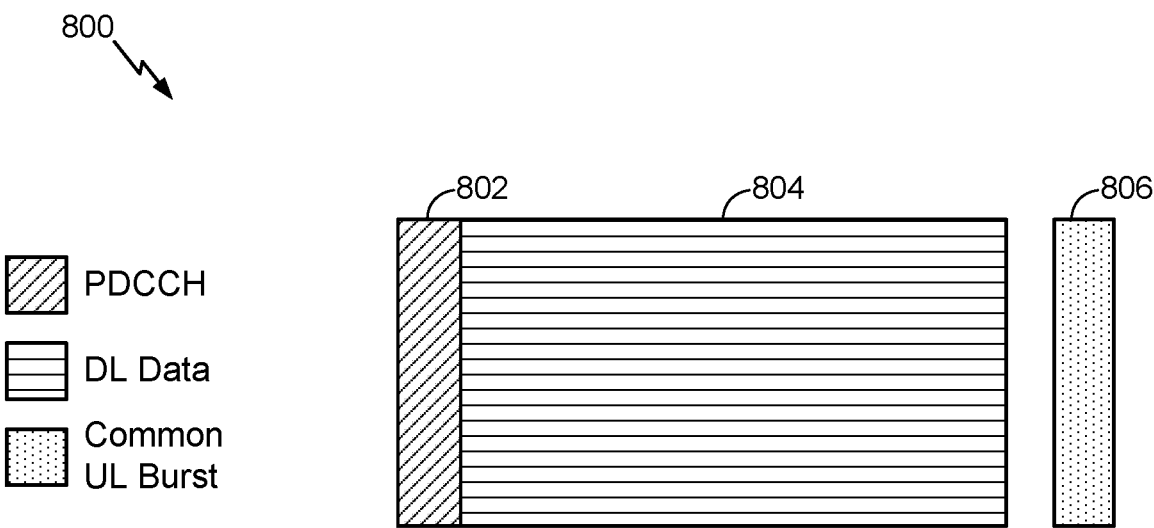
FIG. 8 is a diagram illustrating an example of a downlink (DL)-centric subframe, in accordance with certain aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
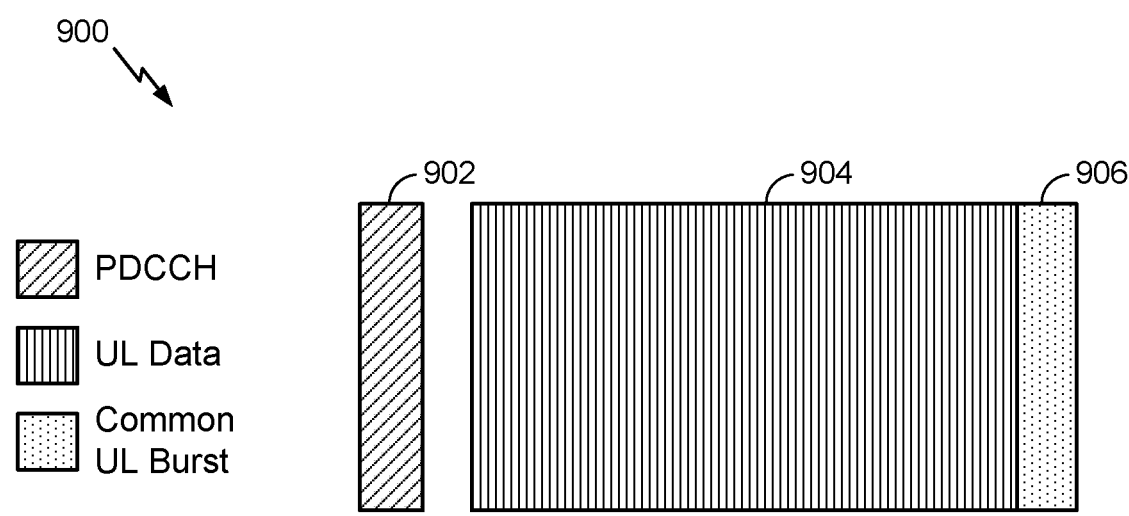
FIG. 9 is a diagram illustrating an example of an uplink (UL)-centric subframe, in accordance with certain aspects of the present disclosure.

FIG. 9 is a diagram 900 showing an example of an UL-centric subframe. The UL-centric subframe may include a control portion 902. The control portion 902 may exist in the initial or beginning portion of the UL-centric subframe. The control portion 902 in FIG. 9 may be similar to the control portion 802 described above with reference to FIG. 8. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 806 described above with reference to FIG. 8. The common UL portion 906 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Example Methods and Apparatus for Transmission and Reception with Partial Allocation in OFDMA/SC-FDMA Systems Traditionally, receiver and transmitter architectures of conventional OFDMA/SC-FDMA systems have been designed so that they work even for cases when the resource allocation is full (e.g., the signal occupies a full set of resources in the system).

Figure 10:
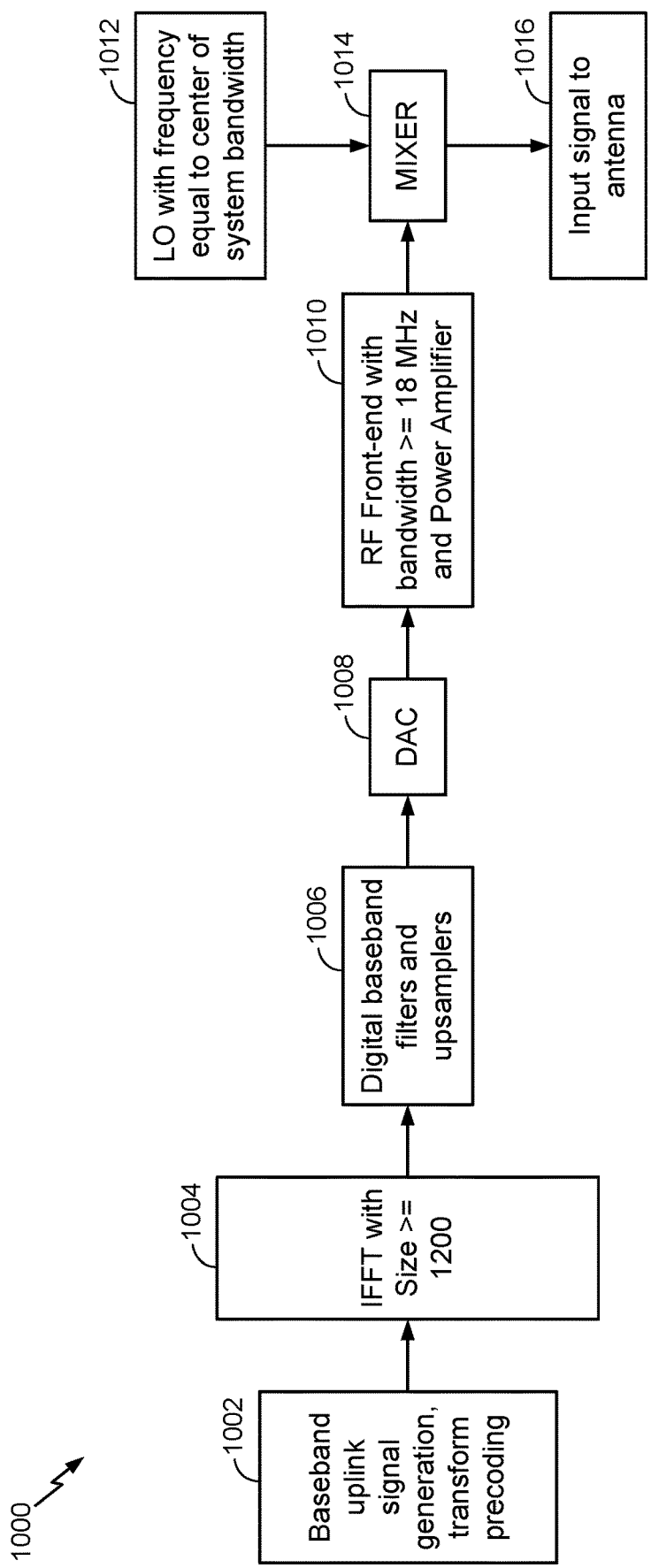
FIG. 10 is a block diagram of a conventional OFDMA/SC-FDMA transmitter architecture, in accordance with certain aspects of the present disclosure.

FIG. 10, for example, illustrates a block diagram of a conventional OFDMA/SC-FDMA transmitter architecture 1000 for a LTE 20 MHz system bandwidth, in accordance with certain aspects of the present disclosure. Note that while FIG. 10 illustrates a conventional transmitter architecture for a UE (e.g., for an uplink signal), those of ordinary skill in the art will recognize that a similar transmitter architecture may apply for a base station. As shown, at 1002, the baseband uplink signal is generated. In some cases, there may also be a transform precoding applied to the generated signal at 1002. At 1004, the baseband uplink signal is input into a IFFT, which transforms the signal from the frequency domain to the time domain. Generally, the size (e.g., number of bins) of the IFFT in conventional transmitter architectures is greater than or equal to the system bandwidth. For example, as shown, the number of bins of the IFFT≥1200 (since in this example the system bandwidth is equal to 1200 frequency tones).

At 1006, the signal is filtered and/or upsampled, and, at 1008, the signal is input into a digital to analog converter (DAC). At 1010, radio frequency (RF) front end processing with a bandwidth greater than or equal to the system bandwidth (the example in the figure indicates 18 MHz) is performed on the signal. The signal is then input into the mixer at 1014. In addition, a local oscillator (LO) 1012 with frequency equal to the center of the system bandwidth is also fed into the mixer at 1014. The signal output from the mixer is then input to the antenna (at 1016) for transmission.

Figure 11:
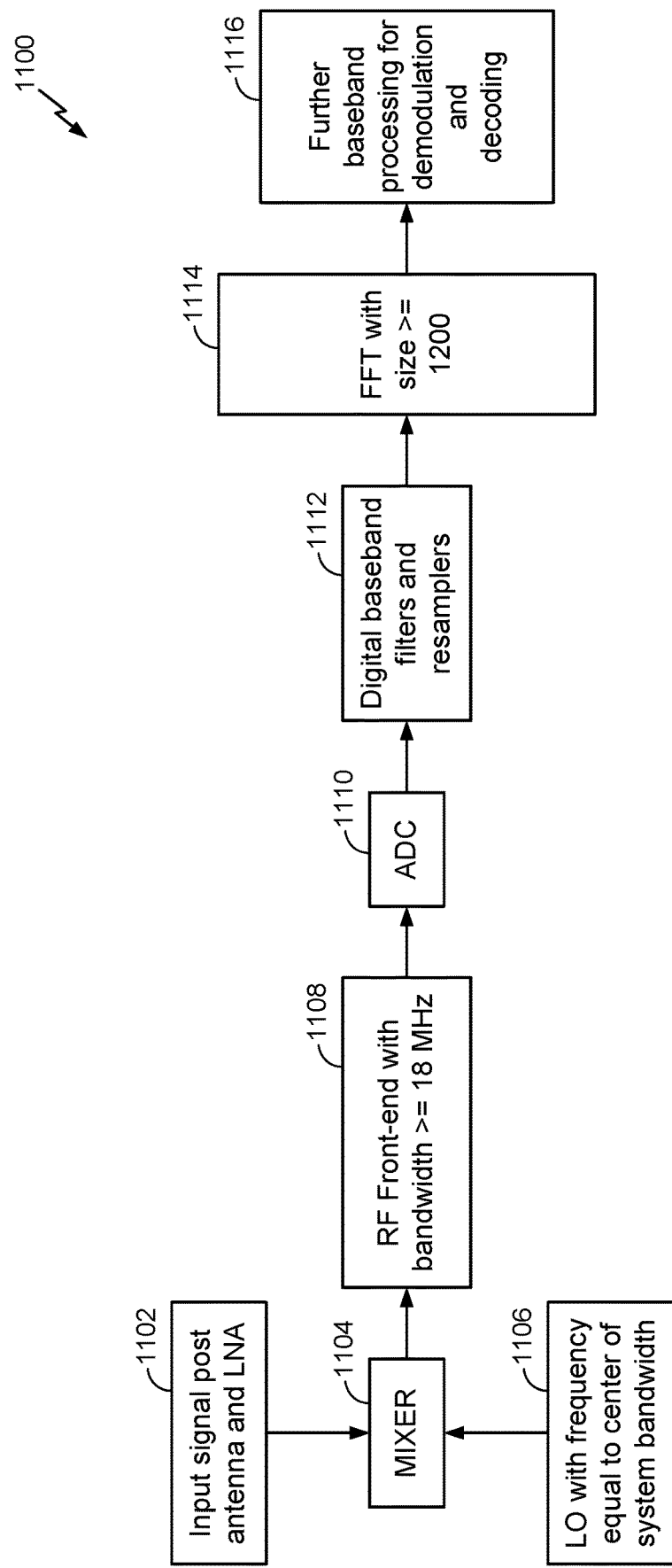
FIG. 11 is a block diagram of a conventional OFDMA/SC-FDMA receiver architecture, in accordance with certain aspects of the present disclosure.

FIG. 11 illustrates an example block diagram of a conventional OFDMA/SC-FDMA receiver architecture 1100 for a LTE 20 MHz system bandwidth, in accordance with certain aspects of the present disclosure. The receiver architecture 1100 may be complimentary to the transmitter architecture 1000 depicted in FIG. 10. As shown, a signal received from another apparatus may be amplified via a low noise amplifier (LNA) at 1102, and input into a mixer at 1104. In addition, a LO 1106 with frequency equal to the center of the system bandwidth may be fed into the mixer at 1104.

At 1108, RF front end processing may be applied to the signal output from the mixer. In such a conventional system, the RF front end processing generally operates with a bandwidth greater than or equal to the system bandwidth (the example in the figure indicates 18 MHz). After RF front end processing, the signal is input into an analog to digital convertor (ADC) at 1110, filtered and/or resampled at 1112, and input into a FFT at 1114. The FFT transforms the signal from the time domain to the frequency domain. The size of the FFT in conventional systems is generally greater than or equal to the system bandwidth (e.g., 1200 frequency tones in this example). Once transformed, further baseband processing for demodulation and decoding may be performed at 1116.

Recently, however, with evolving demands for low data rate and low cost applications, new challenges have emerged for designing efficient transmitter and receiver architectures for specifications with allocations smaller than the larger system bandwidth. One reference example of such a system in which the techniques presented herein may be applicable is eMTC. For example, the resource allocation associated with transmitter and receiver designs in eMTC is generally contained in a bandwidth of 1.08 MHz (6 resource blocks or 72 frequency tones) within a much larger system bandwidth of up to 20 MHz (1200 frequency tones).

Aspects presented herein provide techniques that allow for different possible transmitter and receiver implementations for an OFDMA/SC-FDMA system where the allocated tones for a given transmission are a strict subset of the tones within the full system bandwidth. More specifically, as described below, aspects presented herein provide techniques that allow devices to adapt parameters used for performing analog front-end processing, digital baseband processing, residual phase compensation, etc., for a signal (e.g., to be transmitted from the device, or received from a device) based in part on the resource allocation used for the signal.

Note that for the sake of clarity, much of the following description uses specifications and terminology associated with eMTC LTE CAT M1 UE, and assumes that the allocation for physical channels in uplink and downlink will be in a set of six consecutive physical resource blocks (PRBs), where each PRB includes 12 subcarriers. Those of ordinary skill in the art, however, will recognize that the techniques presented herein can generally be applied to any OFDMA/SC-FDMA based system with partial allocation, such as NB-IoT. Further, while much of the description relates to transmitter/receiver architecture designs for a UE, those of ordinary skill in the art will recognize that the techniques presented herein can also be applied to transmitter/receiver architecture designs for a base station.

Figure 12:
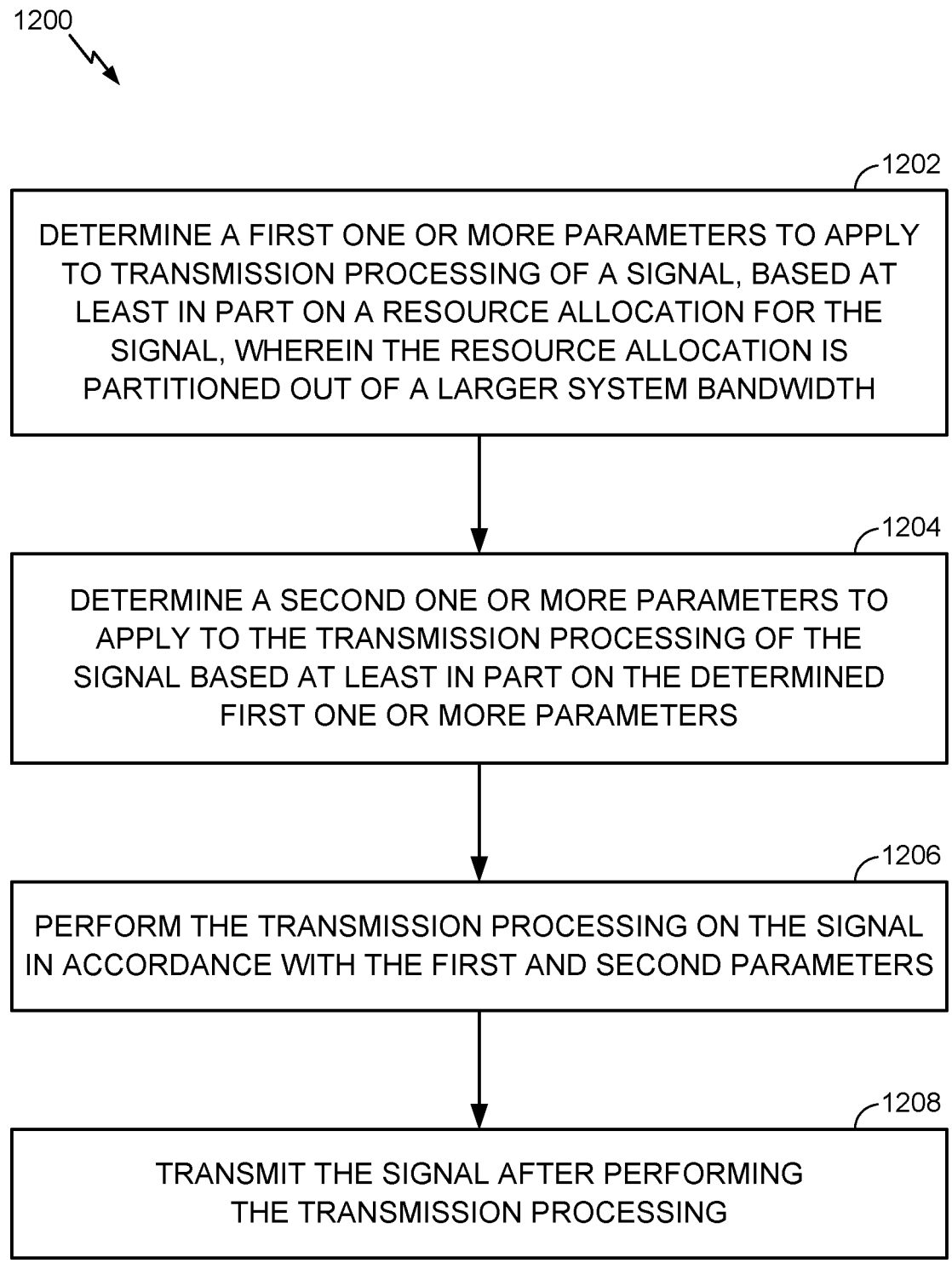
FIG. 12 is a flow diagram illustrating operations performed by an apparatus transmitting a signal, in accordance with certain aspects of the present disclosure.

FIG. 12 is a flow diagram illustrating example operations 1200 for wireless communications, in accordance with certain aspects of the present disclosure. The operations 1200 may be performed, for example, by a transmitting apparatus (e.g., base station 110, UE 120, etc.). The operations 1200 begin, at 1202, where the transmitting apparatus determines a first one or more parameters (e.g., LO frequency, front end processing bandwidth, IFFT size, etc.) to apply to transmission processing of a signal, based at least in part on a resource allocation for a signal. The resource allocation is partitioned out of a larger system bandwidth.

At 1204, the transmitting apparatus determines a second one or more parameters (e.g., tone offset, phase ramp, phase offset, LO frequency offset, etc.) to apply to the transmission processing of the signal based at least in part on the determined first one or more parameters. At 1206, the transmitting apparatus performs the transmission processing of the signal in accordance with the first and second parameters. At 1208, the transmitting apparatus transmits the signal after performing the transmission processing. In some aspects, the first and/or second parameters may be adaptively changed based on where the allocation is within the system bandwidth.

Figure 13:
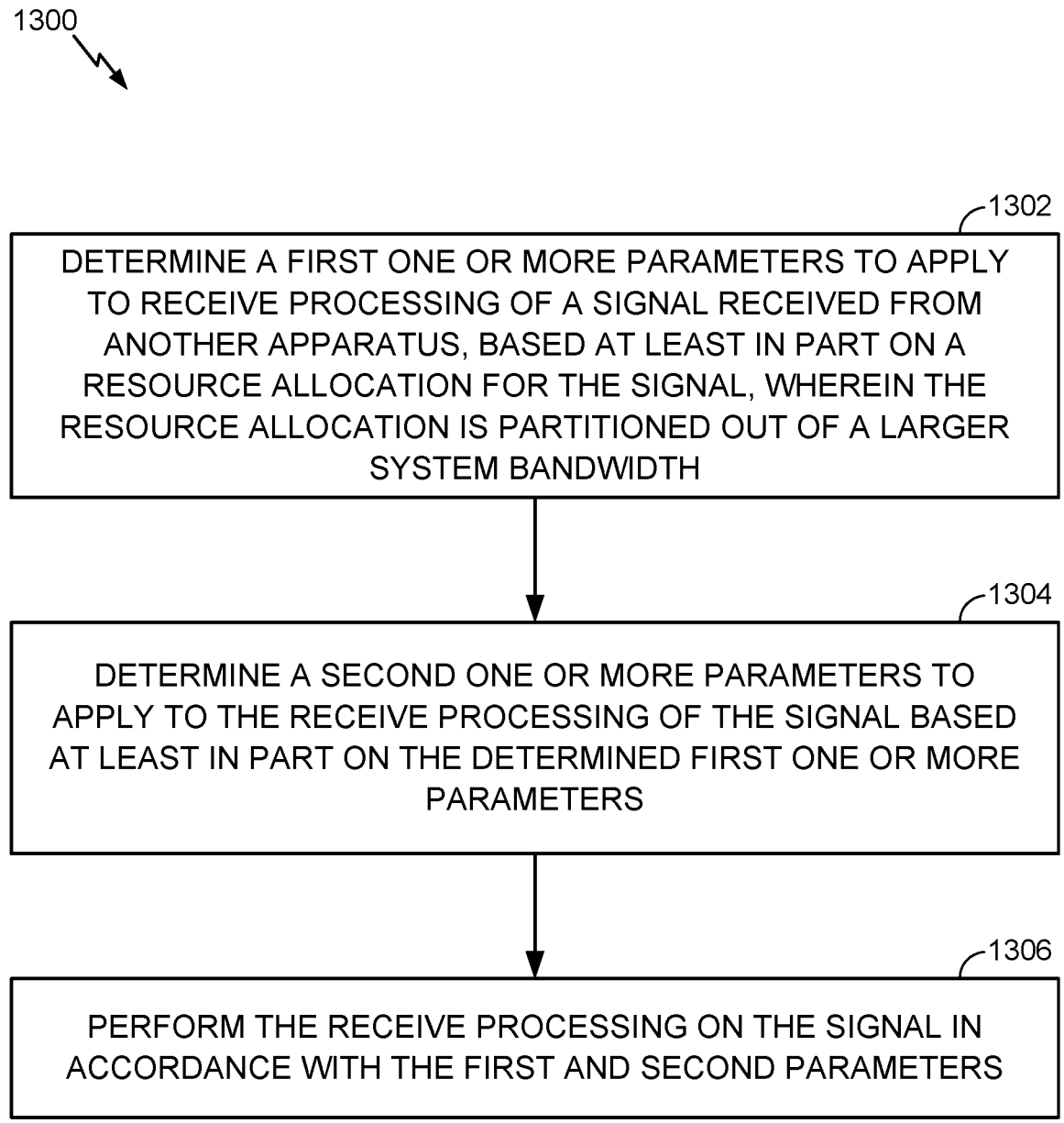
FIG. 13 is a flow diagram illustrating operations performed by an apparatus receiving a signal, in accordance with certain aspects of the present disclosure.

FIG. 13 is a flow diagram illustrating example operations 1300 for wireless communications, in accordance with certain aspects of the present disclosure. The operations 1300 may be performed, for example, by a receiving apparatus (e.g., base station 110, UE 120, etc.). The operations 1300 begin, at 1302, where the receiving apparatus determines a first one or more parameters (e.g., LO frequency, front end processing bandwidth, FFT size, etc.) to apply to receive processing of a signal received from another apparatus, based at least in part on a resource allocation for a signal. The resource allocation is partitioned out of a larger system bandwidth.

At 1304, the receiving apparatus determines a second one or more parameters (e.g., tone offset, phase ramp, phase offset, LO frequency offset, etc.) to apply to the receive processing of the signal based at least in part on the determined first one or more parameters. At 1306, the receiving apparatus performs the receive processing of the signal in accordance with the first and second parameters. In some aspects, the first and/or second parameters may be adaptively changed based on where the allocation is within the system bandwidth.

According to certain aspects, techniques presented herein allow apparatus to choose parameters (e.g., first parameters) associated with at least one of analog front-end processing or digital baseband processing. For example, the apparatus can choose a LO frequency and/or front-end bandwidth associated with analog front-end processing. In addition, the apparatus can choose a FFT/IFFT size associated with digital baseband processing. As described below, the apparatus may choose the first parameters and/or adapt the choices of the first parameters based on the resource allocation used for the signal. The resource allocation (or allocated subset of tones) can hop across the system bandwidth for different transmissions.

Depending on where in the full system bandwidth the allocation is, the LO frequency and RF front end bandwidth may be chosen such that the allocated PRBs fall within the RF front-end bandwidth. In one example, the front-end bandwidth can be chosen from a minimum of 1.08 MHz (72 subcarriers, with a subcarrier spacing=15 KHz) up to a maximum of full system bandwidth (e.g., 1200 subcarriers for LTE 20 MHz system bandwidth). Note, however, that different bandwidth ranges may apply for different subcarrier spacings.

Figure 14:
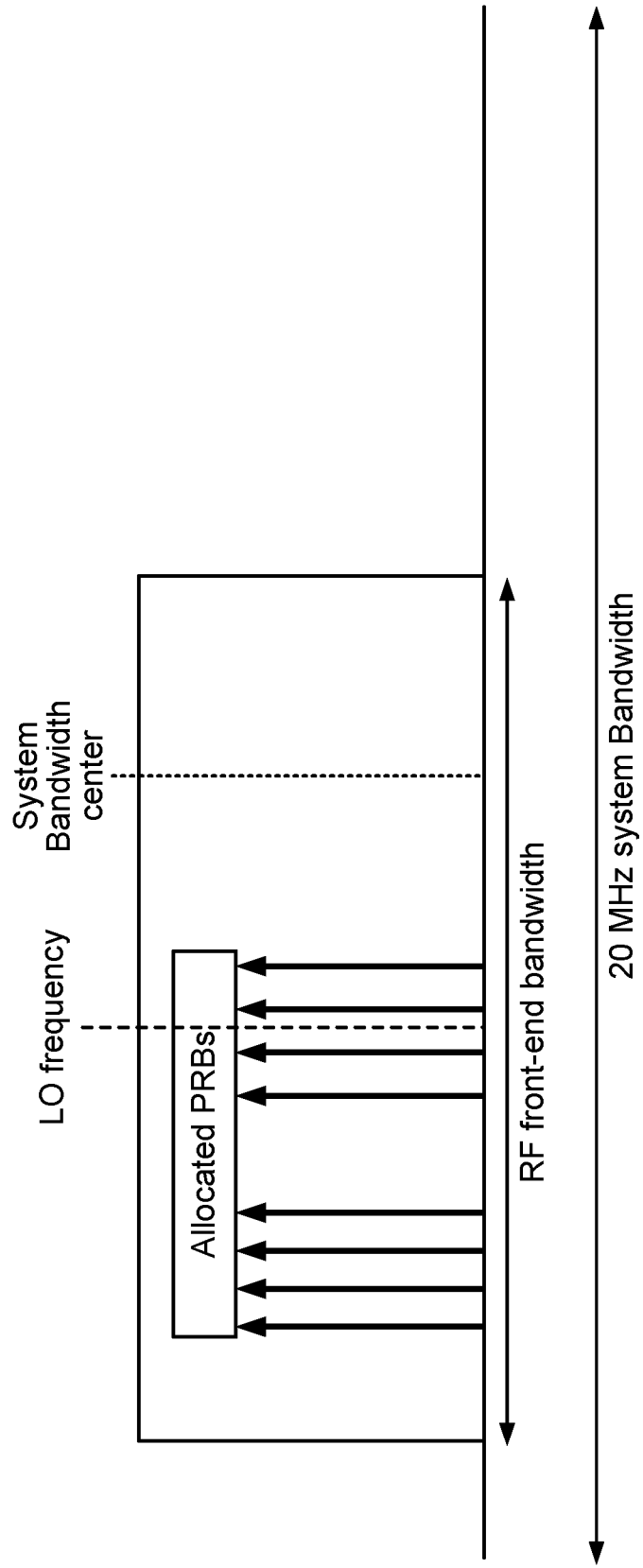
FIG. 14 illustrates an example of a device with front end bandwidth greater or equal to 1.4 MHz and less than 20 MHz, in accordance with certain aspects of the present disclosure.

Standards (e.g., such as eMTC) typically do not specify the particular way to construct transmitters and receivers for eMTC UEs. Aspects presented herein allow a RF or digital baseband bandwidth to be greater than or equal to 1.4 MHz (or allocated PRBs) and less than the full system bandwidth. FIG. 14, for example, illustrates an example of a receiver for CAT M1 (e.g., eMTC UE) with a front end bandwidth greater than 1.4 MHz and less than 20 MHz. In some aspects, the LO frequency may be chosen such that it does not fall inside the resource allocation. In some aspects, the LO frequency may be chosen such that it does fall inside the resource allocation. For example, the LO frequency can be chosen such that it is located at the center of the resource allocation, or away from the center of the resource allocation (e.g., such as in FIG. 14). In some aspects, the LO frequency may be set to the center of the system bandwidth and the RF and digital bandwidths may be less than the system bandwidth.

With respect to digital baseband processing, the techniques presented herein allow the IFFT/FFT size to be less than the full system bandwidth. In one aspect, the number of bins associated with the IFFT/FFT size may be larger than or equal to a number of tones associated with the resource allocation and smaller than a number of tones associated with the system bandwidth. Using the resource allocation in eMTC as a reference example, the IFFT/FFT size may be greater than or equal to 72 and less than 1200 for LTE 20 MHz system bandwidth. Note, however, that aspects presented herein can also be applied to scenarios in which the RF front end and digital bandwidths are equal to the allocated PRBs with LO tuned to the center of the allocated PRBs (e.g., such as in eMTC).

In general, the apparatus may consider one or more advantages/tradeoffs when choosing different values for the first one or more parameters. For example, in a UE receiver, choosing a lower analog/digital front-end bandwidth and FFT size can result in area and power savings. On the other hand, having a wider bandwidth than the resource allocation in analog/digital front-end with a larger FFT size may enable the UE to process a larger number of frequency domain pilots, which in turn, may result in more accurate channel estimates, time and frequency tracking performance, etc. Further, in such cases, LO retuning may happen less frequently (compared to when the front end bandwidth is equal to the resource allocation), and symbols which would have otherwise been consumed for retuning can instead be used for channel estimation or demodulation processing.

Likewise, in a UE transmitter, using a smaller IFFT size in baseband and an analog front-end with a lower bandwidth can result in area and power savings. On the other hand, depending on what the digital to analog conversion rate is, using a larger sized IFFT can result in a reduced amount of resampling performed in subsequent stages of digital baseband processing. Further, in some aspects, the LO frequency in the transmitter and receiver can be chosen in such a way that the allocated PRBs are away from LO leakage, to reduce the chances of degrading the signal quality.

According to certain aspects, the apparatus can also choose parameters (e.g., second parameters) associated with residual phase compensation. In some aspects, a cyclic prefix length dependent residual phase compensation procedure may be performed in cases where a OFDMA/SC-FDMA transmitter/receiver uses analog and/or digital bandwidths that are less than the full system bandwidth and a LO frequency that is not tuned to the center of the system bandwidth. Based on the LO frequency and/or IFFT size, the residual phase compensation can be applied using any number of or combination of the following in the analog and/or digital signal processing chain: (1) as a continuous time-domain phase ramp or frequency domain shift; (2) as a per OFDM symbol constant phase shift; or (3) as a start tone shift at the input of IFFT (e.g., for a transmitter) or output of FFT (e.g., for a receiver). Note that the techniques described herein for determining the second parameters (e.g., for phase compensation) may apply to scenarios where the RF front end and digital bandwidth cover only the allocated PRBs (e.g., are equal to the resource allocation) and to scenarios where the RF front end and digital bandwidth are greater than the resource allocation (and less than the system bandwidth). Further the techniques described herein for determining second parameters may apply to scenarios where the LO is tuned to the center of the resource allocation, and to scenarios where the LO is not tuned to the center of the resource allocation.

Figure 15A:
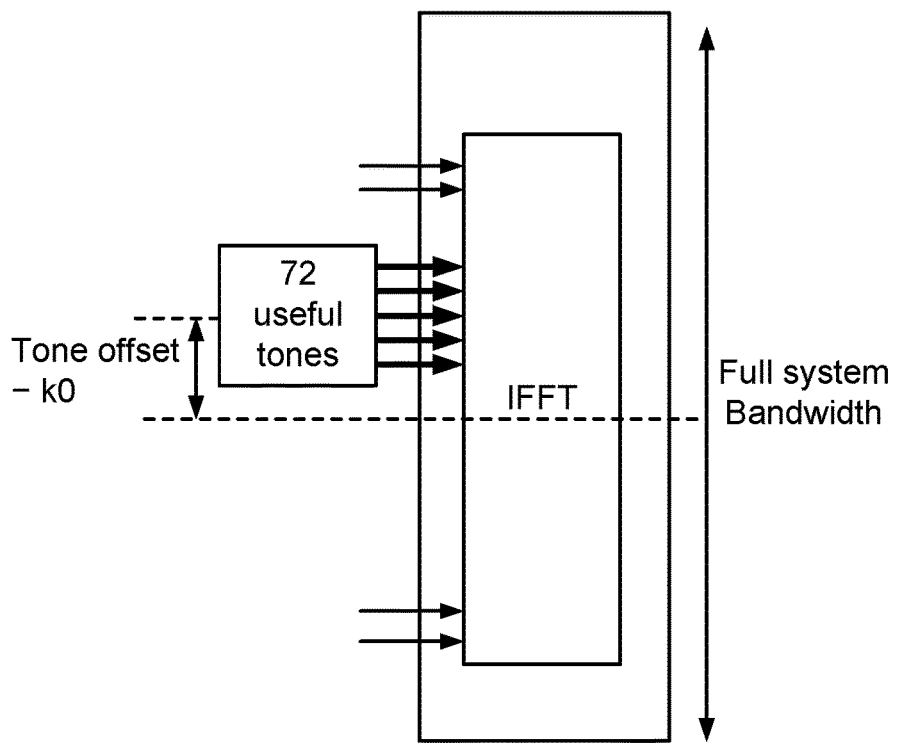
FIG. 15A illustrates an example of applying a start tone shift at the input of a IFFT of a transmitter, in accordance with certain aspects of the present disclosure.

FIG. 15A illustrates an example of performing residual phase compensation by applying a start tone shift at the input of an IFFT (of a transmitter), according to certain aspects of the present disclosure. In this example, the IFFT size is greater than the resource allocation (e.g., 72 tones) and less than the full system bandwidth (e.g., 1200 tones). As shown, the input tones to the IFFT are offset from the center of the system bandwidth by tone offset k0 (where the tone offset is relative to a center of the resource allocation).

Figure 15B:
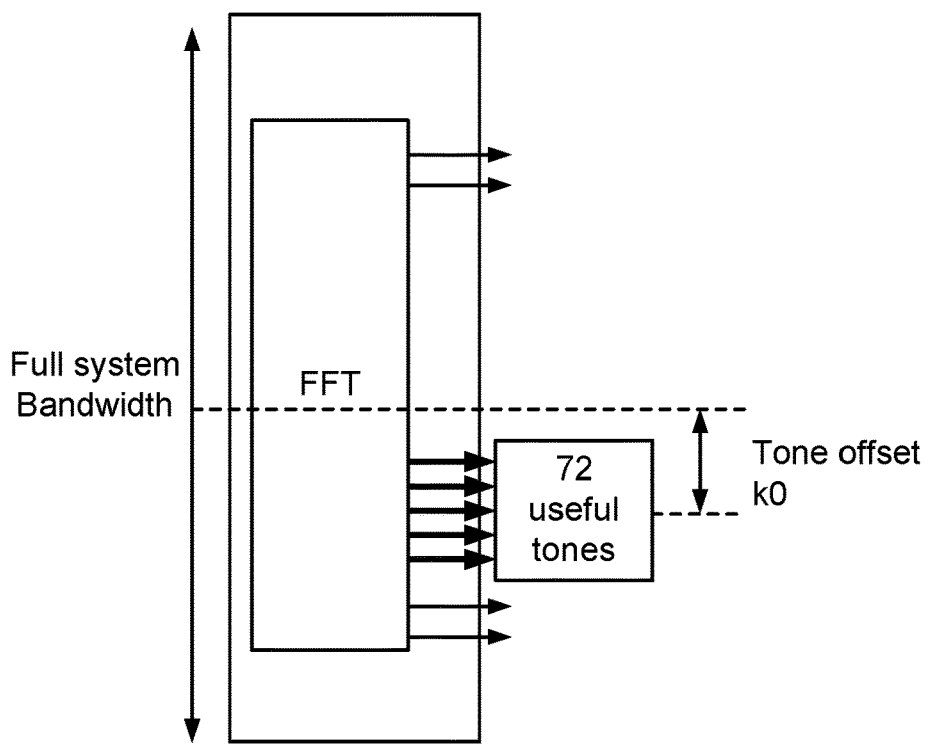
FIG. 15B illustrates an example of applying a tone shift at the output of a FFT of a receiver, in accordance with certain aspects of the present disclosure.

FIG. 15B illustrates an example of performing residual phase compensation by applying a tone shift at the output of an FFT (of a receiver), according to certain aspects of the present disclosure. Similar to FIG. 15A, in this example, the FFT size is greater than the resource allocation and less than the system bandwidth. As shown, for reception, the tones at the output of the FFT offset from the center of the system bandwidth by k0 tones are extracted (where the tone offset is relative to a center of the resource allocation).

In some aspects, the apparatus may select values for each of the second parameters such that a phase difference between a start of one or more symbols of the signal and an end of the one or more symbols is zero. For example, for the generation of a proper OFDMA/SC-FDMA signal with 72 tones allocated, a transmitting apparatus may perform residual phase compensation such that the following condition (1) is satisfied for all l and t:

$$\left(2\pi t(\Delta f_{LO} + \Delta f_{com} - (k0 - k_{start} - 36)\Delta f) + \phi_l + 2\pi(k0 - k_{start} - 36)\Delta f \sum_{i \le l} T_{CP}^i\right) \bmod 2\pi = 0.$$

Likewise, to properly receive a OFDMA/SC-FDMA signal, a receiving apparatus may perform residual phase compensation such that the condition (1) is satisfied for all l and t. In condition (1), $k_{start}$ is the allocation starting tone in the full system bandwidth, $\Delta f_{LO}$ is the LO frequency shift with respect to center of the system bandwidth, k0 is the tone offset at the input of the IFFT/output of the FFT, respectively, $\Delta f_{con}$t is the continuous time domain phase ramp (or frequency offset $\Delta f_{con}$ in frequency domain), $\Phi_1$ is the constant per-symbol phase shift for the 1$^{th}$ symbol, $\Delta f$ is the OFDM sub-carrier spacing, and $T^i_{cp}$ denotes the CP duration for the i$^{th}$ symbol.

As noted above, in some aspects, the (transmitting/receiving) apparatus may adaptively change the first and/or second parameters based on where the allocation is within the system bandwidth. The resources used for transmission, for example, may hop across the system bandwidth for different transmissions. As the resources hop, techniques presented herein allow the (transmitting/receiving) apparatus to efficiently adapt transmission/receive processing based on the location of the resources. For example, based on the start tone $k_{start}$ of the resource allocation, one or more of the LO frequency shift $\Delta f_{LO}$, frequency offset $\Delta f_{con}$, tone offset k0, and constant per-symbol phase offset $\Phi_1$ can be adaptively chosen such that condition (1) is satisfied. In this manner, techniques presented herein provide an efficient transmitter/receiver architecture design that is able to adapt to changing partial allocations in communication systems.

In one reference example for a transmitter, assume that a resource allocation of 6 RBs (out of a full system bandwidth of 20 MHz and normal cyclic prefix) starts from RB 2. In this example, $k_{start}$ would be equal to −576. Based on this value of $k_{start}$, if the transmitting apparatus chooses a tone offset k0=−28, frequency offset $\Delta f_{con}$=28*(tone spacing of 15 KHz), per-symbol phase offset $\Phi_1$=0, and LO shift $\Delta f_{LO}$=−540*15 KHz, the transmitting apparatus can satisfy condition (1) for generation of a proper OFDMA/SC-FDMA signal for transmission (in which a partial allocation is used and/or LO frequency is not at the center of the system bandwidth). For normal cyclic prefix in LTE, one reference example of selecting the parameters in order to satisfy condition (1) may include: (i) selecting the per-symbol phase offset to be zero; (ii) selecting a tone shift that is a multiple of 128 (in this example, the tone shift (k0−(kstart+36))=−512); and (iii) applying any additional frequency shift needed as a time-domain phase ramp or frequency shift in digital or analog processing chain or as an offset to LO frequency.

Figure 16A:
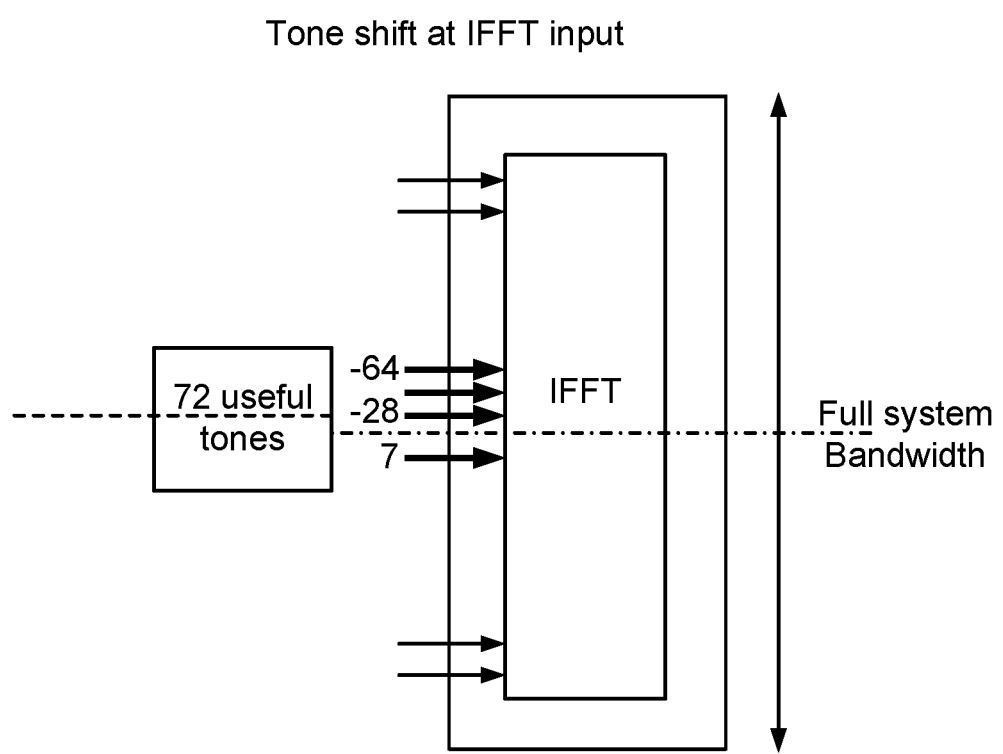
FIGS. 16A-C illustrate an example of transmission processing of a signal for parameter values adaptively chosen based on a resource allocation used for the signal, in accordance with certain aspects of the present disclosure.
Figure 16B:
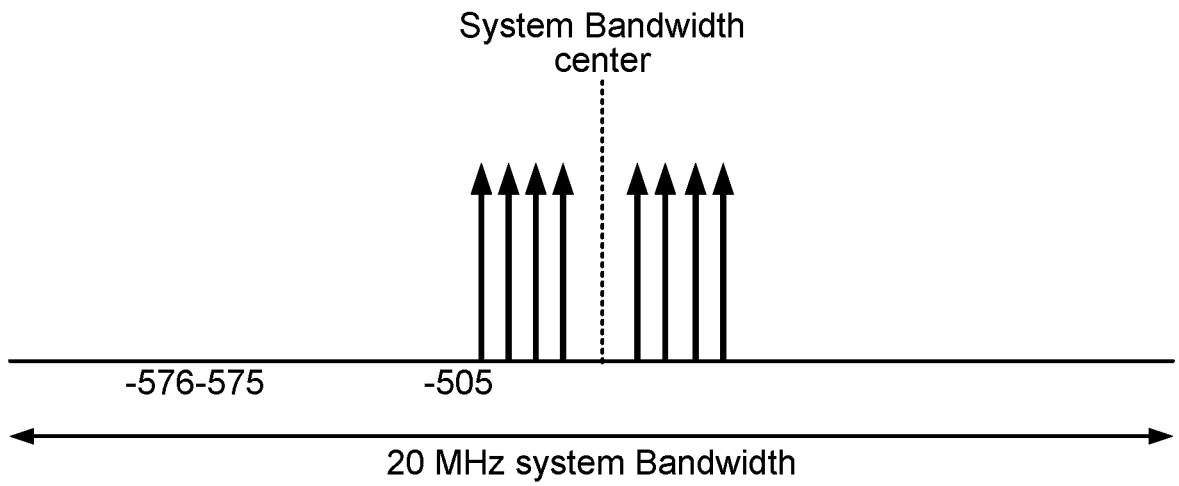
Figure 16C:
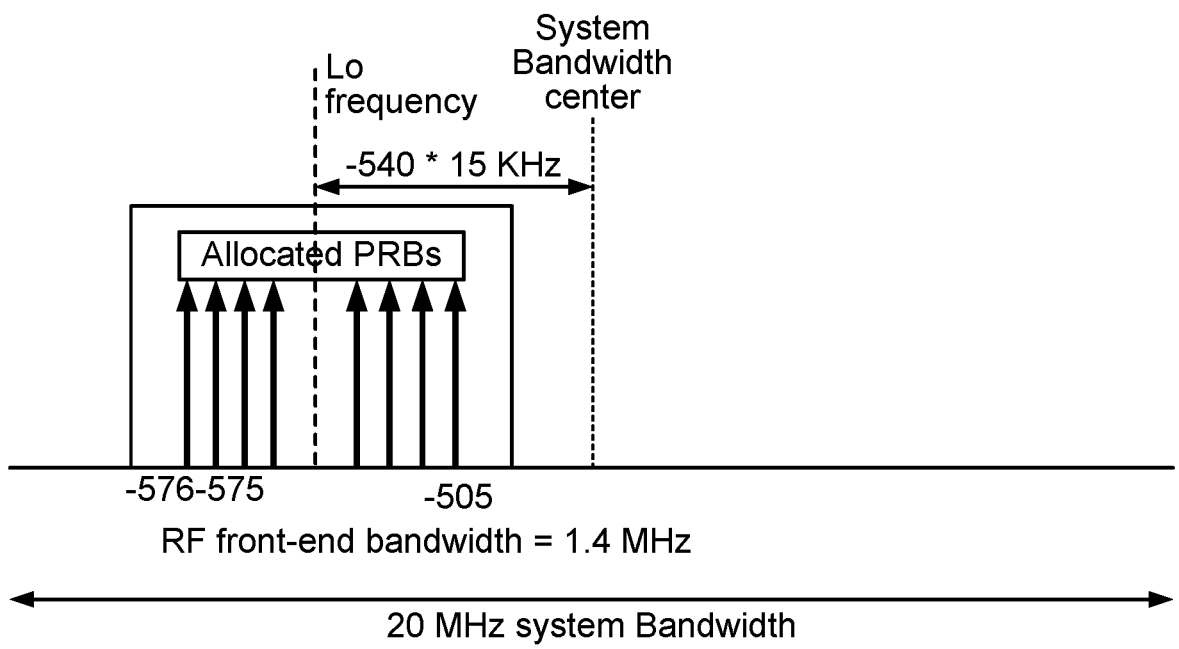

FIG. 16A shows an example of the transmitting apparatus applying a tone shift (of k0=−28) to the allocated PRBs at the input of the IFFT in the transmitter processing chain. Referring now to FIG. 16B, once a continuous time domain phase ramp (or frequency shift of 28*15 KHz) is applied, the waveform is centered at the center of the full system bandwidth. Referring now to FIG. 16C, after the frequency shift, there is a frequency translation in LO (since the LO frequency was chosen to be something other than the center of the system bandwidth), which results in the waveform illustrated in FIG. 16C. Note that the example described above and illustrated in FIG. 16C considers a scenario where the LO is at the center of the allocated PRBs, the RF front-end bandwidth is similar to LTE legacy 1.4 MHz, and the phase compensation parameters (e.g., second parameters) satisfy condition (1). Those of ordinary skill will recognize that the techniques presented herein can be used in other scenarios (e.g., with different values for the LO frequency, RF front-end bandwidth, and/or phase compensation parameters).

Figure 17A:
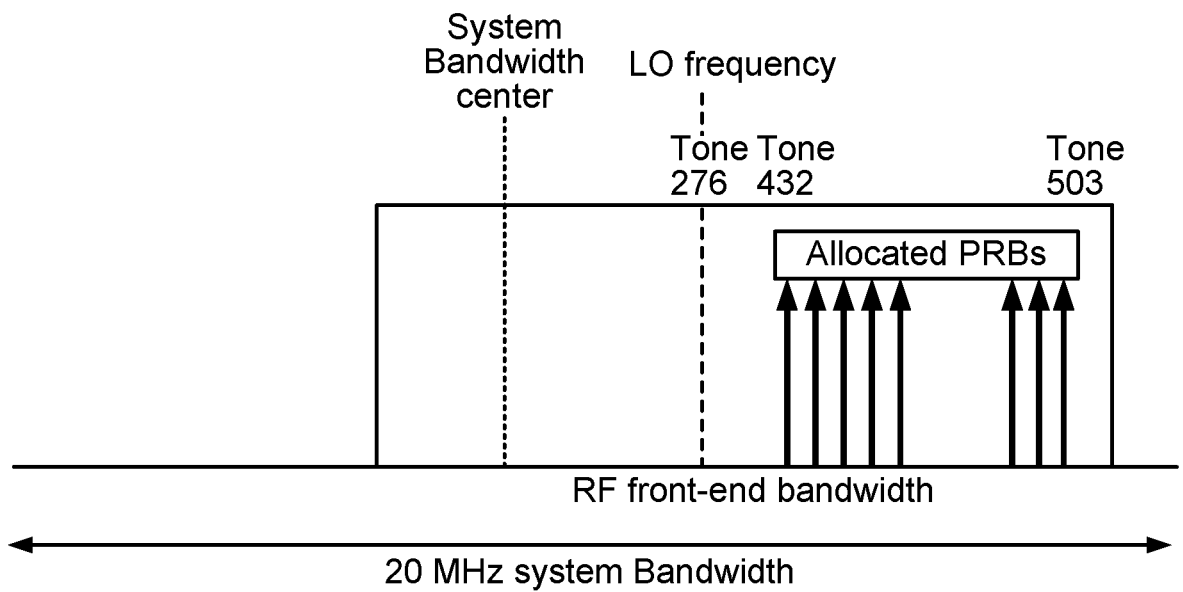
FIGS. 17A-B illustrate an example of receive processing of a signal for parameter values adaptively chosen based on a resource allocation used for the signal, in accordance with certain aspects of the present disclosure.
Figure 17B:
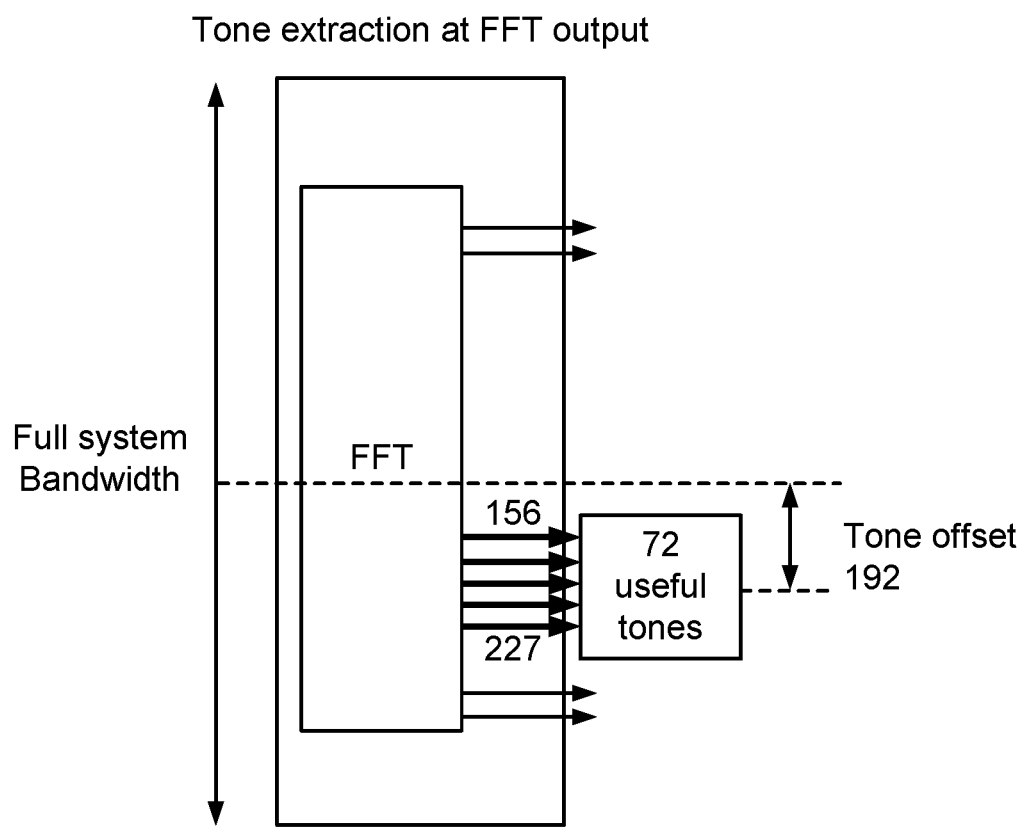

In one reference example for a receiver, assume that a resource allocation of 6 RBs (out of a system bandwidth of 20 MHz) starts from RB 86. In this example, $k_{start}$ would be equal to 432. Based on this value of $k_{start}$, if the receiving apparatus chooses a LO shift $\Delta f_{LO}$=−540*15 KHz, $\Delta f_{con}$=0, per-symbol phase offsets $$\varphi_0 = \frac{2\pi * 160 * 276}{2048}$$

$$\varphi_l = \varphi_0 + \frac{2\pi * 144 * l * 276}{2048}$$

and tone offset k0=192, the receiving apparatus can satisfy condition (1). Note, in general, any constant phase offset added to the above phase values may also satisfy condition (1), since the channel as well as the data symbols may see a constant phase shift. FIGS. 17A-B depict an example of the receiving apparatus using the above parameter values to perform receive processing of a signal received from another apparatus.

Figure 18:
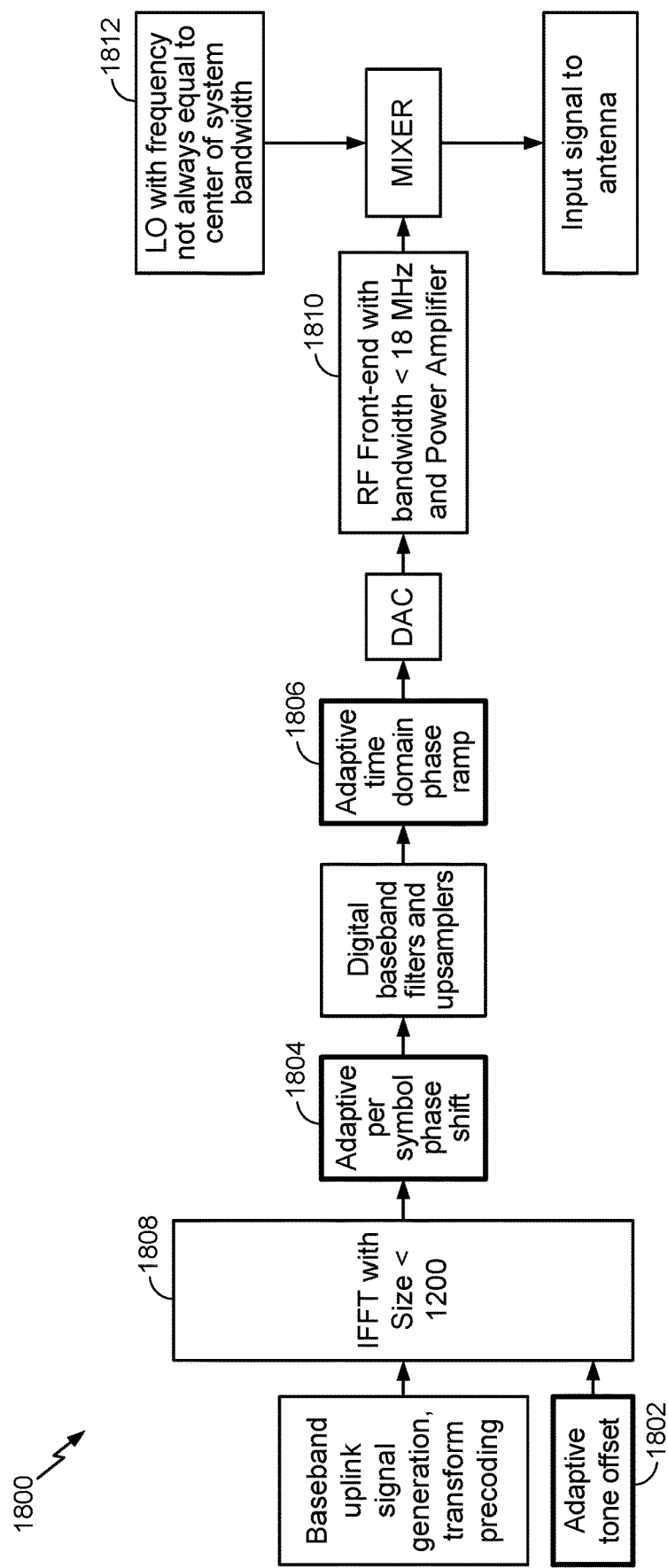
FIG. 18 is a block diagram of a OFDMA/SC-FDMA transmitter architecture for partial allocations, in accordance with certain aspects of the present disclosure.

FIG. 18 illustrates a block diagram of a OFDMA/SC-FDMA transmitter architecture 1800 configured for partial allocation, in accordance with certain aspects of the present disclosure. As shown, compared to the conventional transmitter architecture 1000 illustrated in FIG. 10, the architecture 1800 may allow for an adaptive phase compensation procedure to be performed on the generated signal. For example, at 1802, an adaptive tone offset may be applied to the input of the IFFT. At 1804, an adaptive per symbol phase shift can be applied to the signal. At 1806, an adaptive time domain phase ramp can be applied.

Note that the transmitter may perform one or more of 1802-1806 or any combination of 1802-1806 in order to implement phase compensation. Further, note that the adaptive per-symbol phase shift can be applied anywhere in the digital or analog chain. Similarly, the time domain phase ramp can be applied anywhere in the digital or analog processing chain as a phase ramp or as a frequency shift after IFFT.

In addition, as also shown in FIG. 18, compared to the conventional transmitter architecture 1000, the transmitter architecture 1800 may use (at 1808) an IFFT with a size that is less than the system bandwidth (size less than 1200 used in this example), a RF Front end bandwidth that is less than the system bandwidth (less than 18 MHz used in this example) (1810), and/or a LO frequency that is not tuned to the center of the system bandwidth (1812).

Figure 19:
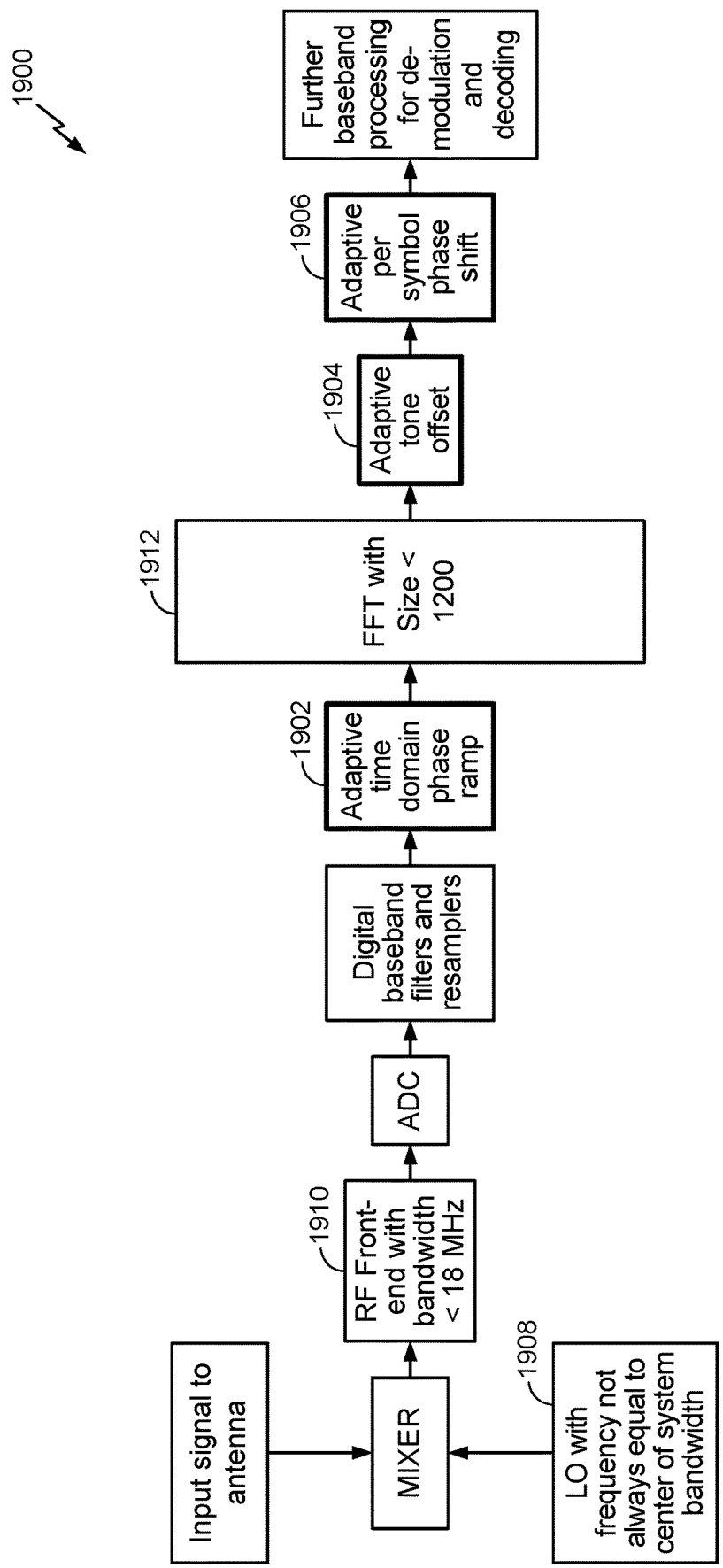
FIG. 19 is a block diagram of a OFDMA/SC-FDMA receiver architecture for partial allocations, in accordance with certain aspects of the present disclosure.

FIG. 19 illustrates a block diagram of a OFDMA/SC-FDMA receiver architecture 1900 configured for partial allocation, in accordance with certain aspects of the present disclosure. As shown, compared to the conventional receiver architecture 1100 illustrated in FIG. 11, the architecture 1900 may allow for an adaptive phase compensation procedure to be performed on a signal received from another apparatus. For example, at 1902, an adaptive time domain phase ramp can be applied to the signal. At 1904, an adaptive tone offset can be applied at the output of the FFT. At 1906, an adaptive per symbol phase shift can be applied.

Note that the receiver may perform one or more of 1902-1906 or any combination of 1902-1906 in order to implement phase compensation. Further, note that the adaptive per-symbol phase shift can be applied anywhere in the digital or analog chain. Similarly, the time domain phase ramp can be applied anywhere in the digital or analog receive processing chain as a phase ramp or as a frequency shift before FFT.

In addition, as also shown in FIG. 19, compared to the conventional receiver architecture 1100, the receive architecture 1900 may use (at 1908) a LO with a frequency that is not tuned to the center of the system bandwidth, a RF front end bandwidth that is less than the system bandwidth (18 MHz used in this example) (1910), and/or a FFT with a size that is less than the system bandwidth (size <1200 used in this example). Further note that while FIGS. 18-19 use a system bandwidth of 20 MHz, those of ordinary skill in the art will recognize that the techniques presented herein may also be applicable to other system bandwidths.

In some aspects, to obtain condition (1), consider the SC-FDMA waveform generation equation (2) within a symbol, for $0 \leq t < (N_{CP}^l + 2048)T_s$ $$s_l(t) = \sum_{k=-N_{RB}^{UL}*6}^{N_{RB}^{UL}*6-1} a_{l,k} \exp(j2\pi(k+1/2)\Delta f(t - T_{CP}^l)). \quad (2)$$

The desired output waveform in a subframe may be given by (3):

$$\sum_{l=0}^{L-1} s_l\left(t - \sum_{i<l} T_{CP}^i\right) = \sum_{l=0}^{L-1} \sum_{k=-N_{RB}^{UL}*6}^{N_{RB}^{UL}*6-1} a_{l,k} \exp\left(j2\pi(k+1/2)\Delta f\left(t - \sum_{i \leq l} T_{CP}^i\right)\right). \quad (3)$$

With a per-symbol phase shift of $\phi_l$, a continuous time domain phase ramp of $\Delta f_{con} t$, and an LO frequency shift of $\Delta f_{LO}$, the output waveform in a subframe may be given by (4):

$$\exp(j2\pi t(\Delta f_{LO} + \Delta f_{com} - (k_0 - k_{start} - 36)\Delta f)) \quad (4)$$

$$\sum_{l=0}^{L-1} \exp\left(j2\pi\left[\phi_l + (k_0 - k_{start} - 36)\Delta f\left(\sum_{i \leq l} T_{CP}^i\right)\right]\right)$$

$$\sum_{k=-N_{RB}^{UL}*6}^{N_{RB}^{UL}*6-1} a_{l,k} \exp\left(j2\pi(k+1/2)\Delta f\left(t - \sum_{i \leq l} T_{CP}^i\right)\right).$$

Once equation (4) is compared with the desired waveform in a symbol in equation (2), it can be seen that the condition in (1) should be satisfied.

Advantageously, the techniques presented herein provide efficient transmitter/receiver designs for OFDMA/SC-FDMA systems with partial allocations. Particularly, techniques presented herein allow such transmitter/receivers to adaptively choose/change transmission/receive processing based in part on the resources allocated for the signal in the system bandwidth.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, setting, selecting, looking up (e.g., looking up in a table, a database or another data structure), detecting, ascertaining, identifying, checking, and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for transmitting, means for receiving, means for sending, means for signaling, means for selecting, means for increasing, means for choosing, means for reducing, means for transforming, means for allocating, means for conveying, means for identifying, means for applying, means for adapting, means for setting, and/or means for decoding may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, receiver processor 238 and/or antenna(s) 234 of the base station 110 illustrated in FIG. 2.

Means for transmitting, means for sending, means for signaling, and/or means for indicating may include a transmitter, which may include a transmit processor 264, and/or antenna(s) 252 of the user equipment 120 illustrated in FIG. 2, and/or the transmit processor 220, and/or antenna(s) 234 of the base station 110 illustrated in FIG. 2. Means for receiving may include a receiver, which may include receiver processor 258 and/or antenna(s) 252 of the user equipment 120 illustrated in FIG. 2 and/or the receiver processor 238 and/or antenna(s) 234 of the base station 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by an apparatus, comprising:
    determining first parameters to apply to transmission processing of a signal, based at least in part on a resource allocation for the signal, wherein:
        the resource allocation is partitioned out of a larger system bandwidth;
        the first parameters comprise a local oscillator (LO) frequency and a front end processing bandwidth;
        the determining comprises selecting the front end processing bandwidth and the LO frequency such that the resource allocation is within the selected front end processing bandwidth; and
        the front end processing bandwidth is larger than or equal to the resource allocation and smaller than the system bandwidth;
    determining a second one or more parameters to apply to the transmission processing of the signal based at least in part on the determined first parameters;
    performing the transmission processing of the signal in accordance with the first parameters and the second one or more parameters; and
    transmitting the signal after performing the transmission processing.

2. The method of claim 1, wherein the first parameters further comprise an inverse fast fourier transform (IFFT) size.

3. The method of claim 1, wherein the LO frequency is not at a center of the system bandwidth.

4. The method of claim 1, wherein the LO frequency is at the center of the system bandwidth.

5. The method of claim 1, wherein the resource allocation comprises the LO frequency.

6. The method of claim 1, wherein the resource allocation does not comprise the LO frequency.

7. A method for wireless communications by an apparatus, comprising:
    determining a first one or more parameters to apply to transmission processing of a signal, based at least in part on a resource allocation for the signal, wherein:
        the resource allocation is partitioned out of a larger system bandwidth;
        the first one or more parameters comprises at least an inverse fast fourier transform (IFFT) size; and
        a number of bins associated with the IFFT size is larger than or equal to a number of tones associated with the resource allocation and smaller than a number of tones associated with the system bandwidth;
    determining a second one or more parameters to apply to the transmission processing of the signal based at least in part on the determined first one or more parameters;
    performing the transmission processing of the signal in accordance with the first one or more parameters and the second one or more parameters; and
    transmitting the signal after performing the transmission processing.

8. The method of claim 1, wherein the second one or more parameters comprise at least one of a tone offset, a phase ramp, a phase offset, or a LO frequency offset.

9. The method of claim 8, wherein:
    performing the transmission processing comprises performing a phase compensation procedure on the signal; and
    performing the phase compensation procedure comprises at least one of:
        applying the tone offset to the resource allocation of the signal prior to transforming the signal from frequency domain to time domain;
        applying the phase ramp to the signal in the time domain or a frequency shift in the frequency domain; or
        applying a phase shift to each symbol of the signal.

10. The method of claim 8, wherein determining the second one or more parameters comprises selecting at least one of the tone offset, the phase ramp, the phase offset, or the LO frequency offset such that a phase difference between a start of one or more symbols of the signal and an end of the one or more symbols of the signal is zero.

11. The method of claim 1, wherein at least one of the first parameters or the second one or more parameters is adaptively changed based in part on a location of the resource allocation within the system bandwidth.

12. The method of claim 1, wherein the signal comprises one or more orthogonal frequency division multiple access (OFDMA) symbols or one or more single-carrier frequency division multiple access (SC-FDMA) symbols.

13. An apparatus for wireless communication, comprising:
    at least one processor configured to:
        determine first parameters to apply to transmission processing of a signal, based at least in part on a resource allocation for the signal, wherein:
            the resource allocation is partitioned out of a larger system bandwidth;
            the first parameters comprise a local oscillator (LO) frequency and a front end processing bandwidth;

the first parameters are determined by selecting the front end processing bandwidth and the LO frequency such that the resource allocation is within the selected front end processing bandwidth; and the front end processing bandwidth is larger than or equal to the resource allocation and smaller than the system bandwidth;

determine a second one or more parameters to apply to the transmission processing of the signal based at least in part on the determined first parameters; and perform the transmission processing of the signal in accordance with the first parameters and the second one or more parameters;

a transmitter configured to transmit the signal after performing the transmission processing; and a memory coupled to the at least one processor.

14. A method for wireless communications by an apparatus, comprising:

determining first parameters to apply to receive processing of a signal received from another apparatus, based at least in part on a resource allocation used for the signal, wherein:

the resource allocation is partitioned out of a larger system bandwidth;

the first parameters comprise a local oscillator (LO) frequency and a front end processing bandwidth;

the determining comprises selecting the front end processing bandwidth and the LO frequency such that the resource allocation is within the selected front end processing bandwidth; and the front end processing bandwidth is larger than or equal to the resource allocation and smaller than the system bandwidth;

determining a second one or more parameters to apply to the receive processing of the signal based at least in part on the determined first one or more parameters; and performing the receive processing of the signal in accordance with the first parameters and the second one or more parameters.

15. The method of claim 14, wherein the first parameters further comprise a fast fourier transform (FFT) size.

16. The method of claim 14, wherein the LO frequency is not at a center of the system bandwidth.

17. The method of claim 14, wherein the LO frequency is at the center of the system bandwidth.

18. The method of claim 14, wherein the resource allocation comprises the LO frequency.

19. The method of claim 14, wherein the resource allocation does not comprise the LO frequency.

20. A method for wireless communications by an apparatus, comprising:

determining a first one or more parameters to apply to receive processing of a signal received from another apparatus, based at least in part on a resource allocation used for the signal, wherein:

the resource allocation is partitioned out of a larger system bandwidth;

the first one or more parameters comprises at least a fast fourier transform (FFT) size; and a number of bins associated with the FFT size is larger than or equal to a number of tones associated with the resource allocation and smaller than a number of tones associated with the system bandwidth;

determining a second one or more parameters to apply to the receive processing of the signal based at least in part on the determined first one or more parameters; and performing the receive processing of the signal in accordance with the first and second parameters.

21. The method of claim 14, wherein the second one or more parameters comprise at least one of a tone offset, a phase ramp, a phase offset, or a LO frequency offset.

22. The method of claim 21, wherein:

performing the receive processing comprises performing a phase compensation procedure on the received signal; and performing the phase compensation procedure comprises at least one of:

applying the tone offset to the resource allocation of the signal after transforming the signal from time domain to frequency domain;

applying the phase ramp to the signal in the time domain; or applying a phase shift to each symbol of the signal.

23. The method of claim 21, wherein determining the second one or more parameters comprises selecting at least one of the tone offset, the phase ramp, the phase offset, or the LO frequency offset such that a phase difference between a start of one or more symbols of the signal and an end of the one or more symbols of the signal is zero.

24. The method of claim 14, wherein at least one of the first parameters or the second one or more parameters is adaptively changed based in part on a location of the resource allocation within the system bandwidth.

25. The method of claim 14, wherein the signal comprises one or more orthogonal frequency division multiple access (OFDMA) symbols or one or more single-carrier frequency division multiple access (SC-FDMA) symbols.

26. An apparatus for wireless communication, comprising:

a receiver configured to receive a signal from another apparatus;

at least one processor configured to:

determine first parameters to apply to receive processing of the signal, based at least in part on a resource allocation used for the signal, wherein:

the resource allocation is partitioned out of a larger system bandwidth;

the first parameters comprise a local oscillator (LO) frequency and a front end processing bandwidth;

the first parameters are determined by selecting the front end processing bandwidth and the LO frequency such that the resource allocation is within the selected front end processing bandwidth; and the front end processing bandwidth is larger than or equal to the resource allocation and smaller than the system bandwidth;

determine a second one or more parameters to apply to the receive processing of the signal based at least in part on the determined first parameters; and perform the receive processing of the signal in accordance with the first parameters and the second one or more parameters; and a memory coupled to the at least one processor.

* * * * *